US012669452B2

(12) United States Patent
Machuca et al.

(10) Patent No.: US 12,669,452 B2
(45) Date of Patent: Jun. 30, 2026

(54) HYBRID X-ray AND OPTICAL METROLOGY AND NAVIGATION

(71) Applicant: Tokyo Electron Limited, Tokyo (JP)

(72) Inventors: Francisco Machuca, Fremont, CA (US); Vi Vuong, Fremont, CA (US); Andrej Mitrovic, Chandler, AZ (US); Xinkang Tian, Fremont, CA (US); Holger Tuitje, Fremont, CA (US)

(73) Assignee: Tokyo Electron Limited, Tokyo (JP)

( * ) Notice: Subject to any disclaimer, the term of this patent is extended or adjusted under 35 U.S.C. 154(b) by 176 days.

(21) Appl. No.: 18/620,332

(22) Filed: Mar. 28, 2024

(65) Prior Publication Data

US 2025/0060324 A1     Feb. 20, 2025

Related U.S. Application Data

(60) Provisional application No. 63/519,517, filed on Aug. 14, 2023.

(51) Int. Cl.
*G01N 23/2206* (2018.01)
*G01N 21/95* (2006.01)
(Continued)

(52) U.S. Cl.
CPC ..... *G01N 23/2206* (2013.01); *G01N 21/9501* (2013.01); *G01N 23/201* (2013.01); *G01N 23/223* (2013.01); *G01N 2223/6116* (2013.01)

(58) Field of Classification Search
CPC ....... G01N 2223/6116; G01N 21/9501; G01N 23/223; G01N 23/2206; G01N 23/201
See application file for complete search history.

(56) References Cited

U.S. PATENT DOCUMENTS 5,590,170 A * 12/1996 Zweig ................. G01N 23/043
378/63
9,506,871 B1* 11/2016 Flock ................. G01N 21/9501
(Continued)

FOREIGN PATENT DOCUMENTS

CN          108072672 B  *  3/2021  ............. G01J 5/485
WO     WO-2018128995 A1 *  7/2018  ............ H10P 74/203

OTHER PUBLICATIONS

Translation of CN-108072672 (Year: 2021).*
International Search Report and Written Opinion, PCT/US2024/034535, Mailed Oct. 10, 2024, Total pp. 15.

*Primary Examiner* — David J Makiya
*Assistant Examiner* — Soorena Kefayati
(74) *Attorney, Agent, or Firm* — Slater Matsil, LLP

(57) ABSTRACT

A method of characterizing a device under test (DUT) includes illuminating the DUT with a broadband optical beam within an optical field of view (FOV), illuminating the DUT with an X-ray beam within an X-ray FOV overlapping the optical FOV, and concurrently acquiring X-ray metrology information, e.g., one or more X-ray images utilizing various modalities, such as absorption, phase contrast difference, darkfield, small angle X-ray scattering (SAXS) and/or fluorescence, from the X-ray FOV and a plurality of optical images of the optical FOV, each of the optical images corresponding to respective selected wavelengths of the broadband optical beam from each of ultraviolet, visible, and infrared wavelengths, for example including deep ultraviolet, near infrared, or short-wavelength infrared wavelengths. The DUT may be one or more substrates, e.g., stacked, and include electronic devices such as three-dimensional integrated devices.

20 Claims, 8 Drawing Sheets

(51) Int. Cl.
*G01N 23/201* (2018.01)
*G01N 23/223* (2006.01)

(56) References Cited

U.S. PATENT DOCUMENTS

| | | | | | |
|---|---|---|---|---|---|
| 10,801,975 | B2 * | 10/2020 | Bakeman | ............ | G03F 7/70625 |
| 11,538,723 | B2 * | 12/2022 | Chen | ................. | H01J 37/32963 |
| 2001/0022829 | A1 * | 9/2001 | Kaiser | .................. | G01N 23/223 |
| | | | | | 378/45 |
| 2015/0330770 | A1 * | 11/2015 | Poslavsky | .............. | G01B 11/00 |
| | | | | | 702/172 |
| 2016/0139032 | A1 * | 5/2016 | Rampoldi | .......... | G01B 11/0641 |
| | | | | | 356/73 |
| 2017/0261442 | A1 * | 9/2017 | Yun | ......................... | A61B 6/484 |
| 2017/0309063 | A1 * | 10/2017 | Wang | ................... | G06T 19/003 |
| 2017/0336706 | A1 * | 11/2017 | Wang | ................... | A61B 5/0071 |
| 2019/0162676 | A1 * | 5/2019 | Cheng | ................... | G01N 21/33 |
| 2019/0287222 | A1 * | 9/2019 | Cutrale | .................. | G02B 21/08 |
| 2020/0074617 | A1 * | 3/2020 | Zeng | .................... | G01N 21/956 |
| 2020/0225151 | A1 * | 7/2020 | Wang | ................... | G01N 21/211 |
| 2020/0243400 | A1 * | 7/2020 | Wang | ................... | H10P 74/203 |
| 2022/0364850 | A1 * | 11/2022 | Adler | .................. | G01B 11/022 |

* cited by examiner

500

150

552

554

600

150

552

654

800

HYBRID X-ray AND OPTICAL METROLOGY AND NAVIGATION

CROSS-REFERENCE TO RELATED APPLICATIONS

This application claims priority to Provisional Application No. 63/519,517, filed on Aug. 14, 2023. The disclosures of the aforementioned application are hereby incorporated by reference in their entireties.

TECHNICAL FIELD

The present invention relates generally to substrate, electronic device, and three-dimensional integrated device characterization, hitherto device under test (DUT) and in particular embodiments, to systems and methods for characterizing a DUT using concurrent X-ray and optical signals.

BACKGROUND

In the manufacture of a semiconductor device (especially on the nanoscopic scale for future 3D stacked transistors such as gate all around (GAA), and complementary stack field-effect transistor (FET) also referred to as a CFET), various fabrication processes are executed such as film-forming depositions, etch mask creation, patterning, material etching and removal, doping treatments, and lateral deposition/removal of sacrificial layers to form lateral 3D isolation and conductive channel layers. These processes are performed repeatedly to form desired semiconductor device elements comprising a DUT. Historically, with microfabrication, transistors have been created in one plane, with wiring/metallization formed above the active device plane, and have thus been characterized as two-dimensional (2D) circuits or 2D fabrication. Efforts to continue scaling semiconductor device fabrication nodes into the single-digit nanometer scale has resulted in structures with dimensionality too small to be resolved with optical microscopy nor detected by optical scatterometry using model-based analysis using ultraviolet light. Additionally, the desire to continue to improve "power performance, area, cost" (PPAC) has led to structures becoming increasingly vertical (i.e., complex three-dimensional (3D) devices spanning multiple planes for GAA and CFET in logic, or 3DNAND and >16-layer vertical DRAM in memory). For example, semiconductor device fabricators now seek to employ various 3D strategies including 3D transistors at the chip level and 3D integration (3DI) stacking strategies such as die-to-die, die-to-wafer, and wafer-to-wafer for 3DI of circuits and backside power distribution networks, transistors, memory cells, and interconnections between them.

Characterization of material composition, layer critical dimensions, and integrated structures such as gratings at various points during and after fabrication is important to ensure device yield, minimum functionality, and long-term field reliability. To overcome the limitations of optical microscopy in the late 90's to early 2000's, due to the optical diffraction limit, characterization techniques known as optical critical dimension (OCD) metrology were developed. OCD metrology includes optical scatterometry techniques that are used indirectly acquire structural and compositional information using broadband optical light combined with computational film modeling or high-speed library search functions. Optical scatterometry methods rely on scattering patterns, such as interference fringes, caused by periodic structures on the substrate or simply the response of a blanket film with a target thickness. Because optical scatterometry measurements are inherently indirect, models must be used to link the measured scattering patterns to real-world parameters. The increased complexity of current device structures, including by not limited to, high device density, multiple surfaces to track line variation in the critical features width, edge, and thickness roughness, ultra-small critical dimensions (uCD), large numbers of layers, including highly elusive lateral recesses between nanosheets, and very high aspect ratios, balloon the parameter space of the models, (e.g., with greater than 20-30 parameters that have high intercorrelation using OCD) and thus limits uniquely identifying the values for the critical features from the OCD metrology. For this reason and the fact that the ill-posed mathematical problem is not tractable by optical techniques alone, metrology techniques that can provide high resolution structural, lowest limit of detection compositional information, and deeply penetrating information beyond the capabilities of OCD scatterometry are desirable.

SUMMARY

In accordance with an embodiment of the invention, a method of characterizing a device under test (DUT) includes illuminating a region of the DUT with a broadband optical beam within an optical field of view (FOV) at the region, illuminating a portion of the region of the DUT with an X-ray beam within an X-ray FOV at the portion of the region, and concurrently acquiring an X-ray image of the X-ray FOV and a plurality of optical images of the optical FOV. Each of the optical images correspond to respective selected wavelengths of the broadband optical beam. The selected wavelengths include at least one wavelength from each of the ultraviolet (UV), visible (VIS), and infrared (IR) portions of the optical spectrum. The X-ray FOV is smaller than or equal to and overlapping the optical FOV. The DUT may include a single substrate, electronic device wafer or stack of electronic device wafers, three-dimensional integrated devices on electronic device wafer, or any combination thereof.

In accordance with another embodiment of the invention, a system for characterizing a DUT includes a broadband optical imaging system and an X-ray metrology system. The broadband optical imaging system includes a broadband optical source configured to illuminate a region of the DUT with a broadband optical beam within an optical FOV, and an optical detector having the optical FOV. The X-ray metrology system includes an X-ray source to illuminate a portion of the region of the substrate with an X-ray beam within an X-ray FOV at the portion of the region, and an X-ray detector having the X-ray FOV. The X-ray FOV is smaller than or equal to and overlapping the optical FOV. The broadband optical imaging system and the X-ray metrology system are configured to concurrently acquiring an X-ray image of the X-ray FOV and a plurality of optical images of the optical FOV. Each of the optical images correspond to respective selected wavelengths of the broadband optical beam. The selected wavelengths include at least one wavelength from each of the UV, VIS, and IR portions of the optical spectrum. The DUT may include a single substrate, electronic device wafer or stack of electronic device wafers, three-dimensional integrated devices on electronic device wafer, or any combination thereof.

In accordance with still another embodiment of the invention, a system for characterizing a substrate includes a broadband optical source configured to illuminate a region of the substrate with a broadband optical beam within an optical FOV, a hyperspectral imaging (HSI) snapshot camera having the optical FOV, an X-ray source configured to illuminate a portion of the region of the substrate with an X-ray beam within an X-ray FOV at the portion of the region, and an X-ray detector having the X-ray FOV. The X-ray FOV is smaller than or equal to and overlapping the optical FOV. The X-ray detector and the HSI snapshot camera are configured to concurrently acquire X-ray data from the X-ray FOV and a hyperspectral image cube of the optical FOV. The hyperspectral image cube includes at least one wavelength from each of the deep ultraviolet (DUV), visible, and near infrared (NIR) portions of the optical spectrum.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A illustrates an inline broadband configuration and FIG. 1B illustrates an oblique-incidence broadband configuration in accordance with embodiments of the invention;

FIG. 4A shows a perspective view of the X-ray metrology system and FIG. 4B shows a schematic of the X-ray metrology system in accordance with embodiments of the invention;

Figure 1A:
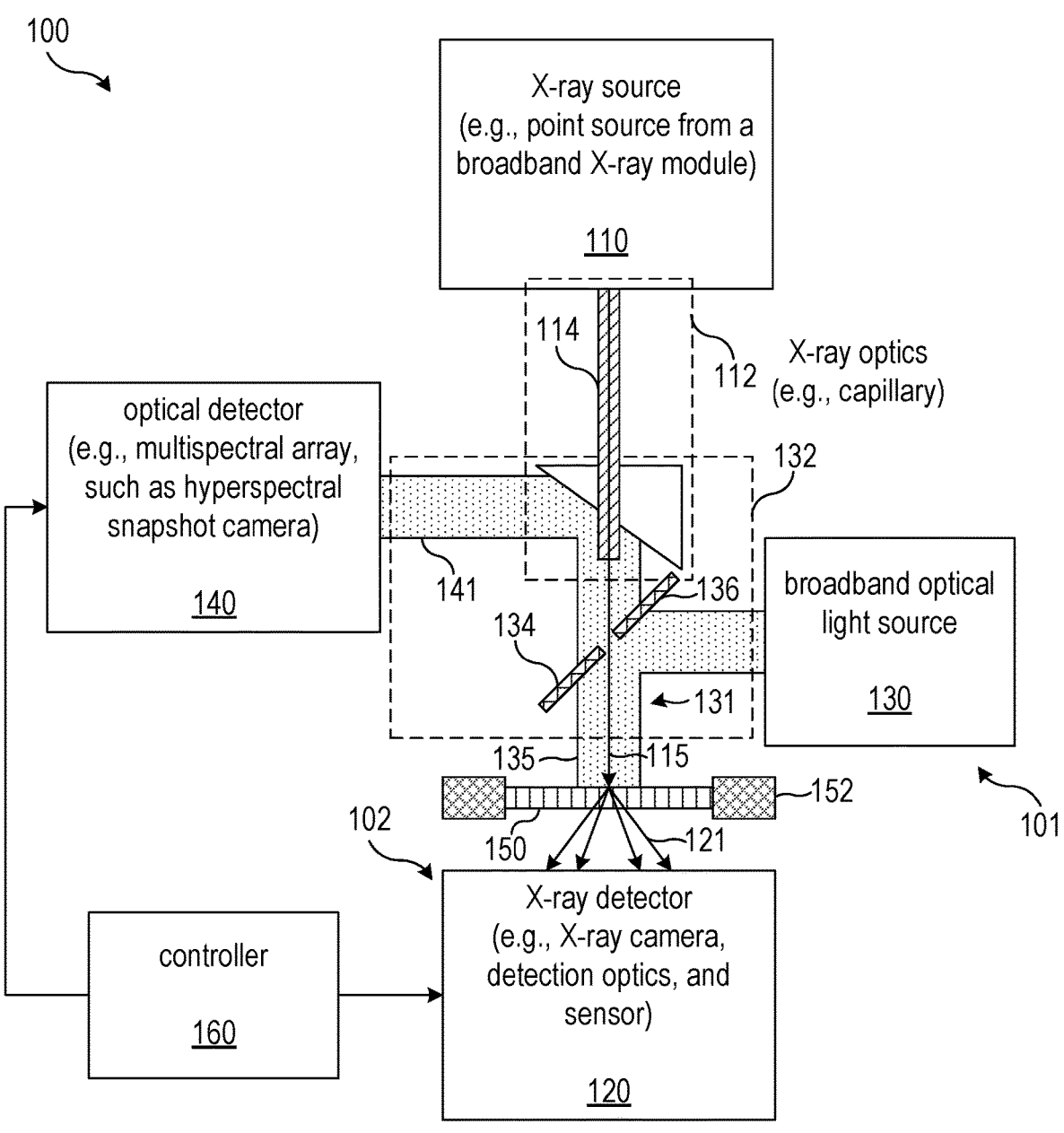
FIG. 1A illustrate an example system for characterizing a substrate including a broadband optical imaging system with a wide optical field-of-view (FOV) and an X-ray metrology system with a smaller X-ray FOV overlapping the optical FOV where

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope. Unless specified otherwise, the expressions "around", "approximately", and "substantially" signify within 10%, and preferably within 5% of the given value or, such as in the case of substantially zero, less than 10% and preferably less than 5% of a comparable quantity.

Various techniques are used to characterize material properties or structures such as critical dimensions giving the target nominal and their respective variations about the mean (i.e., indirectly or directly measure or estimate various properties of a sample or DUT). Characterization techniques may be divided into broad categories based on the mechanism used to probe the sample. For example, electrical characterization techniques use electrical signals to obtain information, optical characterization techniques use light in the optical portion of the electromagnetic spectrum, X-ray characterization techniques use beams in the X-ray portion of the electromagnetic spectrum, and so on.

Characterization techniques may be destructive or nondestructive. That is, destructive characterization techniques damage or alter properties of the sample in some way while nondestructive characterization techniques provide information without substantially impacting the sample, at least to the extent that properties related to the intended use of the sample are unaffected. Nondestructive characterization techniques are desirable because information can be gathered with specificity, repeatably, and without waste. Various measurements that must be taken separately can also be correlated or used in hybrid approach to determine properties since sample is not damaged. Moreover, nondestructive characterization techniques may be used at intermediate stages of fabrication to inform future process parameters of the same substrate or DUT for identification of fatal defects early in a fabrication process, or to feed-forward corrective actions in subsequent process steps.

Characterization of films, intermediate structures, and devices is important during fabrication of microelectronic devices. For example, it is important to have information about the composition (e.g., material types, interfaces, homogeneity) and the structure (e.g., shape, dimensionality) during the fabrication process to provide process control capable of producing reliable and functional devices with high yields. In the past, characterization of micron scale 2D circuits could be performed using image techniques such as optical microscopy. Planar (2D) transistor architecture was still widely used down to gate lengths of 25 nm. Because structures of interest were still at the surface, CD scanning electron microscopy (CD-SEM) was used to provide nondestructive 2D images below the diffraction limit. 3D structural information can be acquired using cross sectional SEM (XSEM) or the even more costly transmission electron microscopy (TEM), but the sample is destroyed. Both XSEM and TEM also require sample preparation, making them unsuitable for inline metrology.

OCD metrology using optical scatterometry (e.g., spectral ellipsometry (SE)) can be used for nondestructive characterization of 3D circuits with feature lengths down to nanometers, theoretically to sub-Angstrom levels for deep ultraviolet SE. Spectral ellipsometry matches polarization measurements with optical models to determine properties such as film thickness and material composition. Basic SE is useful for characterizing multilayer thin films that have long range homogeneity, such as deposited films before patterning. More advanced SE scatterometry techniques such as Mueller matrix spectroscopic scatterometry (MMSE) are necessary to measure complex 3D structures. MMSE expands the polarization information of basic ellipsometry to include light polarized in the s-direction (as opposed to only the p-direction). Due to the inclusion of complete polarization information at a large number of optical wavelengths, complicated models are required to provide the 3D structural characterization.

However, when 3D feature sizes decrease into single-digits of nanometers requiring sub-Angstrom accuracy and repeatability, and the number and complexity of stacked layers increase, the model parameter space becomes too large and the parameters too correlated for conventional OCD metrology to accurately characterize. Additionally, even though optical scatterometry is an indirect measurement technique allowing spatial resolutions below the diffraction limit, optical photons may still be altogether unable to penetrate into the interior of structures with sufficiently small CD (e.g., in the range of 1-10 nm, more preferably 1-5 nm, ideally <3 nm) and sufficiently high aspect ratio (in the range of 10:1 to 1000:1 in general, more preferably 50:1 to 1000:1, and ideally 100:1 to 1000:1). For these reasons, conventional OCD metrology alone is unsuitable for characterization of many cutting edge and future 3D architectures.

X-ray metrology techniques can be used to obtain information that optical metrology techniques are unable to probe. For example, photons in the X-ray portion of the electromagnetic spectrum are highly energetic and are therefore able to penetrate deeply into optically opaque structures, including passing through metal (e.g., a 70 keV photon can penetrate 3 to 4 mm of Cu in general, easily 1 mm of Cu, more easily <100 μm of Cu). Additionally, X-rays have very short wavelengths and are thus able to reach the bottom of high aspect ratio features. However, X-ray metrology techniques function differently than techniques used with optical light in OCD metrology and are not a direct replacement for the OCD metrology suite of tools. Consequently, X-ray metrology is still unable to provide complete information of 3D structures. Another drawback of X-ray metrology is that the field of view (FOV) is limited by X-ray sources, X-ray optics, cost, complexity, and other factors. Therefore, it can be difficult to determine what precise location on a substrate the X-ray measurements apply to.

At present, there are no metrology solutions available that are able to provide accurate characterization information for complex 3D structures with small dimensionality (e.g., single-digits of nanometers or less), high aspect ratios, and multiple buried layers of recessed features and the corresponding line edge, width, thickness roughness'. In various embodiments, the invention relates to methods, systems, and apparatuses that combine X-ray probe measurements with hyperspectral imaging techniques. An X-ray metrology system and a broadband optical imaging system may be integrated into a single metrology tool. The X-ray probe system may include an X-ray source (e.g., at least partially spatially coherent) and an X-ray detector. The broadband optical imaging system may include a broadband optical source and a hyperspectral optical detector. For example, the broadband optical imaging system may produce and measure multiple wavelengths across a broad spectrum, such as including the ultraviolet (UV) (e.g., including the deep ultraviolet (DUV)), visible (VIS), and infrared (IR) (e.g., including near infrared (NIR) and/or the short-wavelength infrared (SWIR)) portions of the electromagnetic spectrum.

In order to characterize a DUT, a region of the DUT may be illuminated by both a broadband optical beam and an X-ray beam forming a co-registry of two fields of view (i.e., an optical FOV and an X-ray FOV) for simultaneous inspection. The DUT may be a single substrate, an electronic device wafer, a single die, a stack of electronic device wafers, a 3DI system of devices and/or circuits (die-to-die, die-to-wafer, and wafer-to-wafer), or any combination thereof. In some implementations, the X-ray illumination and the optical illumination may be aligned so that the two beams of electromagnetic radiation are incident on the DUT surface at the substantially the same angle (e.g., normal to the surface, or some other off normal angle of incidence (AOI), such angles needed to take advantage of polarization change for the optical technique).

For example, various embodiments of the invention (1) simultaneously leverage and combine the capabilities of a the multispectral (e.g., hyperspectral) optical camera (e.g., with wide optical FOV and wavelength-dependent snapshot capability) in combination with X-ray metrology, (2) combine a wide range of X-ray techniques, such as fluorescence emission detection or X-ray phase-coherent imaging, in combination with the optical camera, and (3) concurrently use the optical camera as a locator (e.g., navigation to confirm where on the wafer the images are being gathered, and co-registry to identify sites of interest for common measurement and subsequent hybrid metrology).

In some aspects, the invention may simultaneously utilize optical signals from direct imaging (imaging OCD), optical scatterometry, and X-ray signals from one or more techniques such as scattering of hard X-rays (X-rays having energy between about 1 keV to 120 keV and wavelengths in the range of 1 nm to 10 pm), X-ray fluorescence emission detection, phase coherence interference, and others. For example, both hard X-ray scatterometry (e.g., small angle X-ray scatterometry (SAXS)) and optical scatterometry may be performed by a single hybrid metrology apparatus that makes use of both data sets. This rich combination of metrological information may be used to remove cross-term correlation of parameters (e.g., diagonalize regions of large multi-parameter matrices) of models for complex 3D structures, including GAA structures, CFET structures, 3D memory device structures such as vertical NAND (V-NAND), 3D memory interface structures such as high bandwidth memory (HBM) and highly stacked dynamic random access memory (DRAM), and others. For instance, global optimization problems with large numbers of parameters may be solved utilizing libraries and/or machine learning.

The X-ray metrology system may include a super resolving complimentary metal-oxide-semiconductor (CMOS) detector, used for the purpose of X-ray probe analysis, that is capable of discriminating energy. The hybrid metrology systems described herein may make accurate CD determinations in 3D semiconductor structures by decoupling correlation matrices. In various embodiments, X-ray fluorescence is used to correct n and k values (i.e., the real and imaginary part of the refractive index), and/or determine thickness and composition in a single measurement. For example, optical techniques may allow determination of CD or thickness when knowing n and k and vice versa. X-ray may beneficially enable solving for both thickness and composition in a single measurement. Whereas optical n and k is determined by the so-called dielectric function, n and k are determined by atomic scattering factors (i.e., because the dominant factor is total electron density of the solid rather than bonding electrons). For this reason, the two techniques have the advantage of providing uncorrelated information that can be utilized in concert to decouple the intercorrelation (e.g., determining the composition with X-ray and adjusting optical n and k, using machine learning with a black box model, etc.).

The wide (e.g., tens of millimeters) optical FOV (e.g., of a hyperspectral imaging camera) may be used as a low resolution view or low magnification view of the DUT features and the smaller X-ray FOV may be used as a high resolution view or high magnification view (e.g., 1-10 µm in general, 100 nm to 1 µm preferably, and 10-100 nm ideally) that can be quickly switched between the two imaging modalities (e.g., toggled without re-focusing, positioning, altering parameters, etc.). For example, the optical FOV and the X-ray FOV may be co-registered with, for example, the centers pre-aligned during instrument calibration/setup or global alignment, and improved with pattern recognition fine alignment in respective FOV's. This may immediately enable X-ray imaging with submicron resolution without need for complicated re-alignment under the high magnification conditions of the X-ray beam. Additionally, targets in scribe lines or in die regions can be immediately found for analyzing like regions die to die and across the full wafer for the purpose of measuring critical DUT parameters, or automated defect classification (ADC).

The co-registration of the high magnification FOV for X-ray and the low magnification FOV for optical light, may allow fast inspection and measurement to be performed. The optical image may be inspected so that pattern recognition may be used to perform wafer recipe identification, wafer global and fine alignment, and/or align GDSII wafer layout to the printed wafer under test for the purpose of reporting KLARF electronic maps or applying golden reference inspection (i.e., comparing the local die with a reference). Additionally, sub-pixel alignment accuracies may be achieved by simultaneously utilizing a subpixel shifting X-ray camera. In this way, test targets may be efficiently measured, such as CD gratings that are in the size of 1-10 µm pad size, within the scribe line or alternatively direct in die measurement of DUT features. This advantage of having a large optical FOV may enable fast registry to alignment targets that optical OCD fine probes cannot achieve without global searches. With high alignment accuracies, small light spot (e.g., an X-ray spot of 100 nm-1 µm spot) may be landed on a commensurate measurement pad size under high magnification high resolution conditions. Further, the optical camera with pattern recognition and a hardware region of interest (ROI) function may park a large beam (e.g., broadband optical light) over scribe line, and only utilize pixels that exactly fall on the measurement pad without complex global search.

The X-ray metrology system may include an X-ray probe with a variety of modalities for imaging (e.g., X-ray fluorescence, phase contrast fringe analysis, SAXS or X-ray dark field, or X-ray absorption, etc.). In various embodiments, the X-ray metrology system may be configured to perform X-ray fluorescence emission detection. For example, the X-ray metrology system may operate in transmission mode either with energy discrimination in place using additional optical elements for monochromatizing the X-ray beam, or using a CMOS camera of the X-ray detector in photon counting mode. The X-ray metrology system may also operate in reflection mode, such as with silicon (Si) drifted detectors for energy dispersive or wavelength dispersive detection. In some embodiments, the X-ray metrology system uses transmission that leverages partial spatial coherence to perform direct imaging or interferometric fringe analysis (e.g. Talbot, Lau, or Talbot-Lau configurations). For example, a contrast mechanism may be used such as absorption, phase object changes or phase shift detection (refraction), or small angle scatter in dark field mode (e.g., annular illumination from a monocapillary, illumination from a polycapillary, or illumination from an array of multiple X-ray spots with a fixed pitch causing spatial coherence relationship at the source anode). The X-ray metrology system may also operate in interferometric mode (e.g., by adding an analyzer grating and absorbing grating to analyze fringes caused by X-ray interference).

The systems and methods described herein may have one or more of several advantages over conventional characterization solutions. For example, accurate measurements of film properties and critical dimensions in future transistor nodes such as GAA, CFET, 2D material transistors (e.g., using graphene, moly, etc.), and complex stacked V-NAND and HBM/DRAM. Wideband (e.g., DUV-VIS-NIR-SWIR) optical scatterometry may be advantageously comingled with X-ray contrast modalities, absorption, phase contrast, small angle scatter from dark field, and fluorescence. A particular possible benefit of X-ray fluorescence is the ability to uniquely measure composition and thickness from a single fluorescence measurement, and feed this into optical models to correct n and k data (ideal thickness used to float n and k parameters, and then calculate in the optical scatterometry the updated structure CD parameters of interest). For example, an ideal film model can be generated and then n and k can be back corrected for thin film compositions within the DUT. The system and methods may advantageously be fully integrated in a single system with both modalities or two separate systems working in tandem as hybrid metrology, and the configurations may be in-situ with the process chamber, integrated metrology within a transfer module, chamber in a cluster tool, or side port or load port or inside the equipment front end module (EFEM) itself, or may stand alone as an inline or an at-line tool within the foundry floor. Further, the methods described herein, have the benefit of being able to be practiced with the addition of super resolution by subpixel shifting the X-ray camera elements or the DUT with respect to the tool.

Figure 1B:
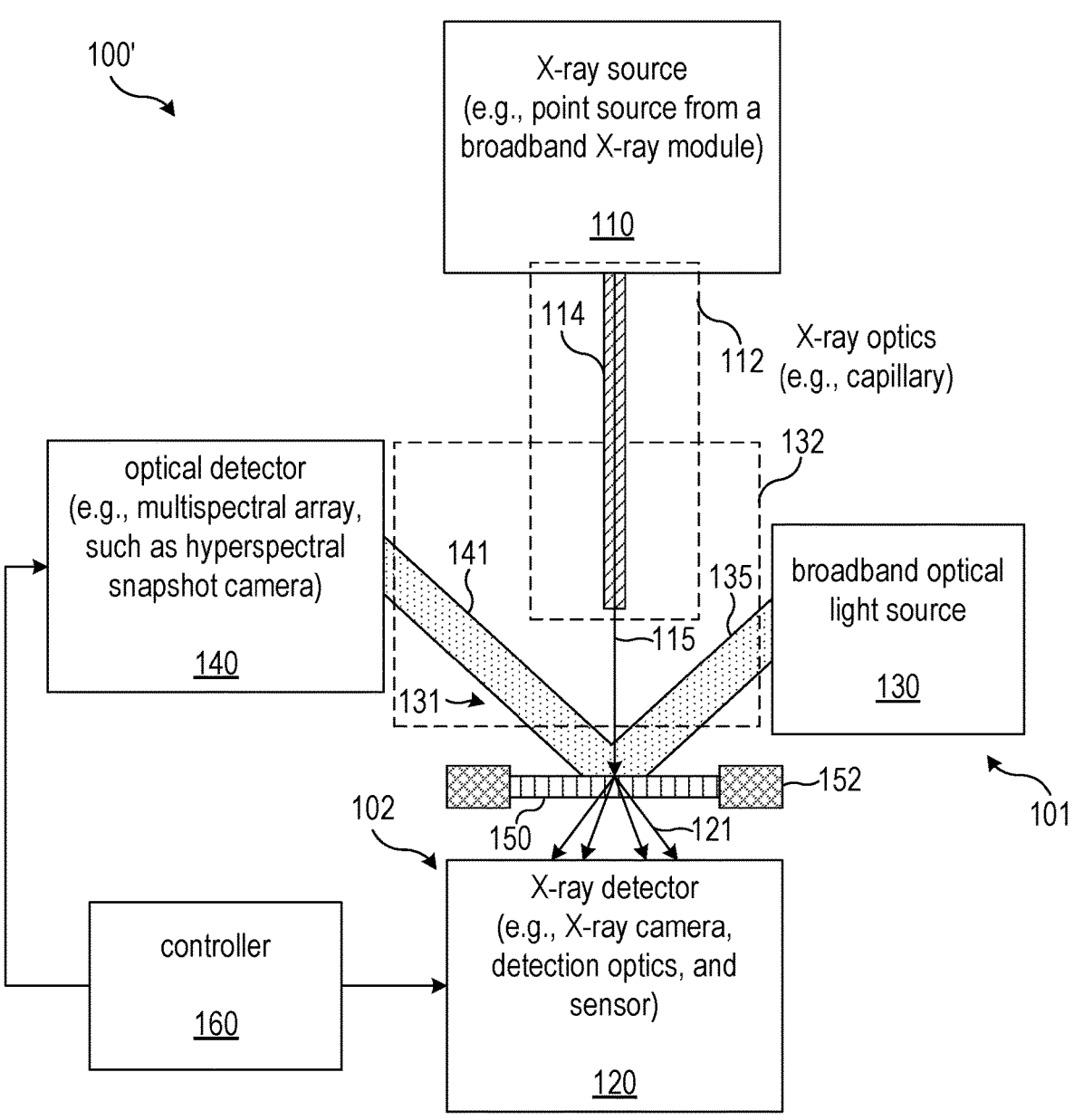

FIGS. 1A and 1B illustrate an example system for characterizing a DUT including a broadband optical imaging system with a wide optical FOV and an X-ray metrology system with a smaller X-ray FOV overlapping the optical FOV where FIG. 1A illustrates an inline broadband configuration and FIG. 1B illustrates an oblique-incidence broadband configuration in accordance with embodiments of the invention.

Referring to FIGS. 1A and 1B, a hybrid metrology system 100 includes a broadband optical imaging system 101 and an X-ray metrology system 102. The hybrid metrology system 100 may be implemented in a variety of settings, such as in situ during semiconductor fabrication processes, or standalone as an inline tool, an at-line tool, or as a separate metrology tool. Various analysis techniques may be performed by the hybrid metrology system 100, including full-field multispectral direct optical imaging, optical scatterometry techniques (e.g., spectral ellipsometry, normal reflectometry, colorimetry, etc.), SAXS or X-ray darkfield, X-ray fluorescence emission detection, defect analysis using outlier detection, defect analysis using supervised machine learning, defect analysis using automated defect classification (ADC), as well as to use the various forms of gathered metrological data to correlate determine and correlate properties (i.e., characterize) a DUT 150. The hybrid metrology system 100 may also use the broadband optical imaging system 101 for navigation purposes to determine and/or verify the precise global location and local high-resolution location on the DUT 150 that the X-ray information originates.

The hybrid metrology system 100 may be suitable for performing a wide variety of measurements, such as film measurements of dielectrics and semiconductors, (e.g., Si, poly Si, Ge, SiGe, GaAs, GaN, SiC), spin on carbon, amorphous hardmask, TIN, SiO2, SiOC, SiN3, HF Oxides, etc. Advantageously, the hybrid metrology system 100 may be able to obtain measurements from three (or more) modalities using one instrument in one shot, such as broadband optical mode, X-ray transmission mode (e.g., refraction and/or dark field), and fluorescence mode, among others. One category of films that may be characterized using the hybrid metrology system 100 are thin metal films (e.g., Ti, Ru, Cu, Mo, W). The hybrid metrology system 100 may also be used for trace element analysis using X-ray fluorescence for residual elements from sacrificial layers used to form 3D recess structures, i.e. Ge in SiGe layers beneath nanosheets used as conductive transistor channels. The hybrid metrology system 100 may be used for enhanced OCD metrology, specifically the hybrid optical and X-ray CD metrology described herein (X-OCD metrology). Some values that may be determined include side wall angles, top and bottom CD, LE and LW roughness, target thickness and thickness variation, target height and height variation, and others. The hybrid metrology system 100 may also be used for defect analysis to identify defects such as voiding, shunts, broken lines, residual SiGe, Ge, etc., as well as determining composition and probing for trace element contamination. Wafer colorimetry for macro defects may also be performed using the hybrid metrology system 100.

The broadband optical imaging system 101 includes broadband optical source 130 configured to produce a broadband optical beam 135 traveling along an optical path 131 that is incident on the DUT 150 and thereafter detected as a reflected optical signal 141 by an optical detector 140, such as a multispectral optical detector array. In one embodiment, the broadband optical imaging system 101 has inline illumination of the DUT 150, as shown in the hybrid metrology system 100 of FIG. 1A. However, this is but one possible configuration. For example, the broadband optical imaging system 101 may also be configured to produce the broadband optical beam 135 at an angle so that there is oblique-incidence illumination of the DUT 150, as shown in the hybrid metrology system 100' of FIG. 1B. The optical detector 140 is configured to detect direct images across a wide optical FOV (e.g., the array of detectors being pixels of a direct image). For example, the optical FOV may be considered large or macroscale relative to the X-ray FOV. In various embodiments, the optical FOV is greater than about 5 mm (such as about 5 mm to about 50 mm in general, 50 mm-150 mm preferably, and >150 mm ideally). However, for some applications, it may be preferable to have an even larger optical FOV, such as greater than about 100 mm to improve wafer throughput in production environments, for example.

In some embodiments, the optical detector 140 is a hyperspectral imager, and is configured with a snapshot mode in one embodiment (i.e., a hyperspectral imaging (HSI) snapshot camera). As will be discussed in more detail later on, images are detected for a broad spectrum of optical wavelengths, including extending outside the visible spectrum in both directions. For example, images are detected for wavelengths in each of the UV (e.g., DUV), VIS, and IR (e.g., NIR and/or SWIR) portions of the electromagnetic spectrum. However, in some embodiments, a non-HSI optical imager may also be used in combination with X-ray diagnostics (e.g., for enhanced navigation, etc.). In these applications, the multispectral nature of the optical detector 140 may be reduced or even configured to detect a single wavelength (or very narrow band of wavelengths).

The broadband optical imaging system 101 may include broadband optics 132 that are configured to direct at least a portion of the broadband optical beam 135 towards the DUT 150 and then direct the reflected optical signal 141 to the optical detector 140. In one embodiment, the broadband optics 132 are configured to direct the broadband optical beam to be coincident with the X-ray beam for illumination and collection. The focusing optics are telecentric in some embodiments, and bi-telecentric in one embodiment. In one embodiment, the broadband optics 132 include a beam splitter 136 that directs a portion of the broadband optical beam 135 to the DUT 150 and the remainder towards a mirror 134. At least a portion of the reflected optical signal 141 also travels through the beam splitter 136 to the mirror 134. The mirror 134 reflects the incident optical signals (portions of broadband optical beam 135 and reflected optical signal 141) towards the optical detector 140. For example, the optical detector 140 may use the portion of the broadband optical beam 135 to compare to the reflected optical signal 141 for optical scatterometry.

The X-ray metrology system 102 includes an X-ray source 110 configured to produce an X-ray beam 115 (i.e., an initial X-ray signal) incident on the DUT 150 and detected as a transmitted X-ray signal 121 by an X-ray detector 120. A sample support 152 (e.g., with an open frame to allow detection of X-rays passing through the DUT), such as an objective stage, substrate support wafer chuck, etc. may be integrated with the X-ray metrology system 102 and positioned between the X-ray source 110 and the X-ray detector 120 during operation so that it supports and controls the positioning of the DUT 150. The sample support 152 is configured to support the DUT and may be configured to scan with at least about micron precision. For example, the sample support 152 may have coordinates aligned with the optical FOV and be configured to navigate in-die or to scribe lines with at least about micron precision. In some embodiments, the sample support 152 may be configured to have even higher precision, such as submicron precision.

The X-ray metrology system 102 may be an X-ray imaging system and/or a non-imaging X-ray system. For example, the X-ray metrology system 102 may be a high-resolution imager for submicron imaging. In some embodiments, the X-ray metrology system 102 has a resolution greater than about 500 nm (i.e. can resolve features at least as small as 500 nm, "sub-500 nm resolution"). In one embodiment, the X-ray metrology system 102 has a resolution greater than about 100 nm ("sub-100 nm resolution"). The X-ray metrology system 102 may be configured to have one or more X-ray contrast modalities such as absorption, phase contrast, small angle scatter from dark field, fluorescence, and others. The X-ray detector 120 may be configured to operate in various modes, such as transmission mode and/or reflection mode. In one embodiment, the X-ray detector 120 is a super-resolving X-ray camera configured to use subpixel shifting.

The X-ray metrology system 102 may include a source-grating-sample detector system, fluorescence detectors above the sample plane, and an X-ray camera below the sample. The X-ray source 110 may have spatial coherence in part, and may have single or multiple X-ray beamlets formed through a GO scatter grating, or multiple microspots engineered into the emitting anode (liquid or solid). Additionally, energy discrimination may be accomplished through various methods, such as a monochromator, polychromator, wavelength or energy dispersion detectors, CMOS camera or other pixelated sensor in photon counting mode, or with thin film elemental or foil filters for high pass filtering (e.g., for larger KE pass) followed by difference imaging, such as practiced in k-edge X-ray subtraction methods.

The X-ray beam 115 may be directed to the DUT 150 by X-ray optics 112, which may include a capillary 114 in various embodiments. For example, the capillary may form an X-ray beam spatially restricted to a certain spot size (e.g., an X-ray FOV) on the DUT 150. The X-ray FOV is within (i.e., overlapping) the larger optical FOV (e.g., coincident on a portion of the DUT 150, co-registered, nested, etc.). The X-ray FOV may be on the order of hundreds of microns up to tens of millimeters. Other sizes are of course possible, with various considerations specific to X-ray source, desired accuracy, X-ray technique, and others.

In some embodiments, more than one X-ray FOV may be concurrently formed on the DUT 150 (using multiple capillaries, for example). The multiple X-ray FOVs may be spaced at a specific known distance from one another and allow simultaneous acquisition of metrological information across the multiple X-ray FOVs. Since the hybrid metrology system 100 is configured to simultaneously acquire optical and X-ray information from regions of the DUT 150, when there are multiple X-ray FOVs, all of the X-ray FOVs are arranged fully within and in a known alignment relative to the optical FOV.

In this specific example, the hybrid metrology system 100 is configured to provide both the X-ray beam 115 and the broadband optical beam 135 at a substantially normal angle of incidence at the DUT 150. While this is not required, there may be various benefits to doing so, such as to avoid shading by high profile features. Here, the capillary 114 extends through the mirror 134 directing the X-ray beam 115 normal to the surface of the DUT 150 while still allowing the wide optical FOV of the reflected optical signal 141 to reflect off the mirror 134 and to the optical detector 140. That is, the optical FOV and the X-ray FOV are co-registered such that data from both can be acquired concurrently.

The optical FOV is a relatively low magnification view (at least for the direct optical images and compared to the X-ray FOV). Additionally, the optical FOV is large, covering all of or a substantial portion of the DUT 150, on the order of tens of millimeters in extent or extending to cover the full wafer area. In contrast, the X-ray FOV is a high magnification view, but only covers a small portion of the DUT 150. The co-registration of the high magnification FOV and the low magnification FOV may allow fast inspection and measurement to be performed. Additional magnification may be achieved in an X-ray to Optical camera conversion module, or in the projection architecture between source, sample and detector plane.

The X-ray FOV is aligned with the optical FOV in various embodiments (e.g., the X-ray FOV is centered in the optical FOV or offset from the optical FOV by some known and predetermined amount. When the X-ray FOV is offset from the optical FOV, the X-ray FOV and the optical FOV may have a coincident corner, for example. The alignment error may be advantageously small allowing imaging of smaller features of the DUT. For example, in one embodiment, the alignment error between the optical FOV and the X-ray FOV allows X-ray imaging of an OCD matrix pad between about 1 μm and about 25 μm. The alignment error between the optical FOV and the X-ray FOV allows X-ray imaging of an in-die feature in one embodiment.

Scatterometry methods can be used to determine properties of semiconductor structures (e.g., dimensions, material/optical properties) using matching of measured spectra from multispectral images, such as hyperspectral image cubes, with predicted, predetermined, or premeasured spectra of structures with known properties. Additional X-ray images may advantageously provide data for constraining the matching process using certain parameter measurements that can be made directly from X-ray images. In classical/basic scatterometry, certain parameters of a structure are "floated" (considered variable) and determined using the spectral matching method. In general, too many "floated" parameters lead to spectral matching difficulties (i.e., too many unknown parameters to determine from the limited spectral data).

However, for the hybrid metrology system 100, X-ray data derived from X-ray images can be used to independently measure some of the same parameters of the structure which in the absence of X-ray data would need to be "floated", thereby increasing the speed and accuracy of scatterometry/OCD. For example, a structure may contain multiple layers, each having a thickness. In scatterometry, each layer thickness would need to be floated and determined from comparison to spectra of known structures with known thicknesses of these same layers, assuming known n and k values. However, if X-ray imaging allows direct determination of at least some of the layer thicknesses, then there is no need to float at least those thicknesses, and the dimensionality of the spectral matching process is reduced (i.e., improved). In scatterometry/OCD parlance, this enhances the spectral model-based separation of fitting variable cross correlation (minimizes correlation of off diagonal terms between fit parameters).

The hybrid metrology system 100 may also include a controller 160. In operation, the controller 160 may execute a sweep of passband wavelengths, while the optical detector 140 simultaneously acquires images which are subsequently received by the controller 160, where they can be stored and/or processed. As the passband wavelength is varied, each image acquired by the optical detector 140 will be acquired at the instantaneous selected passband wavelength. In this manner, an "image stack", or "image cube", hereinafter, is acquired for each sweep of passband wavelength, and received by controller 160. Passband wavelength sweeps can be repeated to acquire successive image cubes. The wavelength sweeps may span several portions of the optical spectrum. For example, the wavelength sweeps may include wavelengths from all of the UV, (e.g., DUV), VIS, and IR (e.g., NIR and/or SWIR) to produce hyperspectral image cubes.

The controller 160 can be programmed, for example, to execute a continuous sweep of passband wavelength, from the minimum to the maximum passband wavelength of a wavelength tunable filter(s). In practice, however, only certain portions of the optical spectrum may be of interest, so the controller 160 may be programmed to selectively tune a passband wavelength across a range or multiple overlapping or non-overlapping ranges of wavelengths in the UV, VIS, and IR portions of the optical spectrum. The controller 160 is also configured to control the acquisition of X-ray metrology information (e.g., to form an X-ray image). The controller 160 may be configured to synchronize the acquisition of optical data and X-ray data so that the respective results can be combined (e.g., to decorrelate parameters). For example, the controller 160 may be configured to acquire the X-ray image and a plurality of optical images (e.g., one or more image cubes acquired by an optical scatterometry imaging spectrometer). The sample support 152 may be configured to scan with movement coordinated with the real-time acquisition enabling a move, acquire, measure cycle time for production metrology and inspection in wafer foundries or device fabricators.

Figure 2:
FIG. 2 illustrates an example broadband optical imaging system including a multispectral optical detector array implemented as a hyperspectral imaging (HSI) system according to embodiments of the invention.
Figure 2:
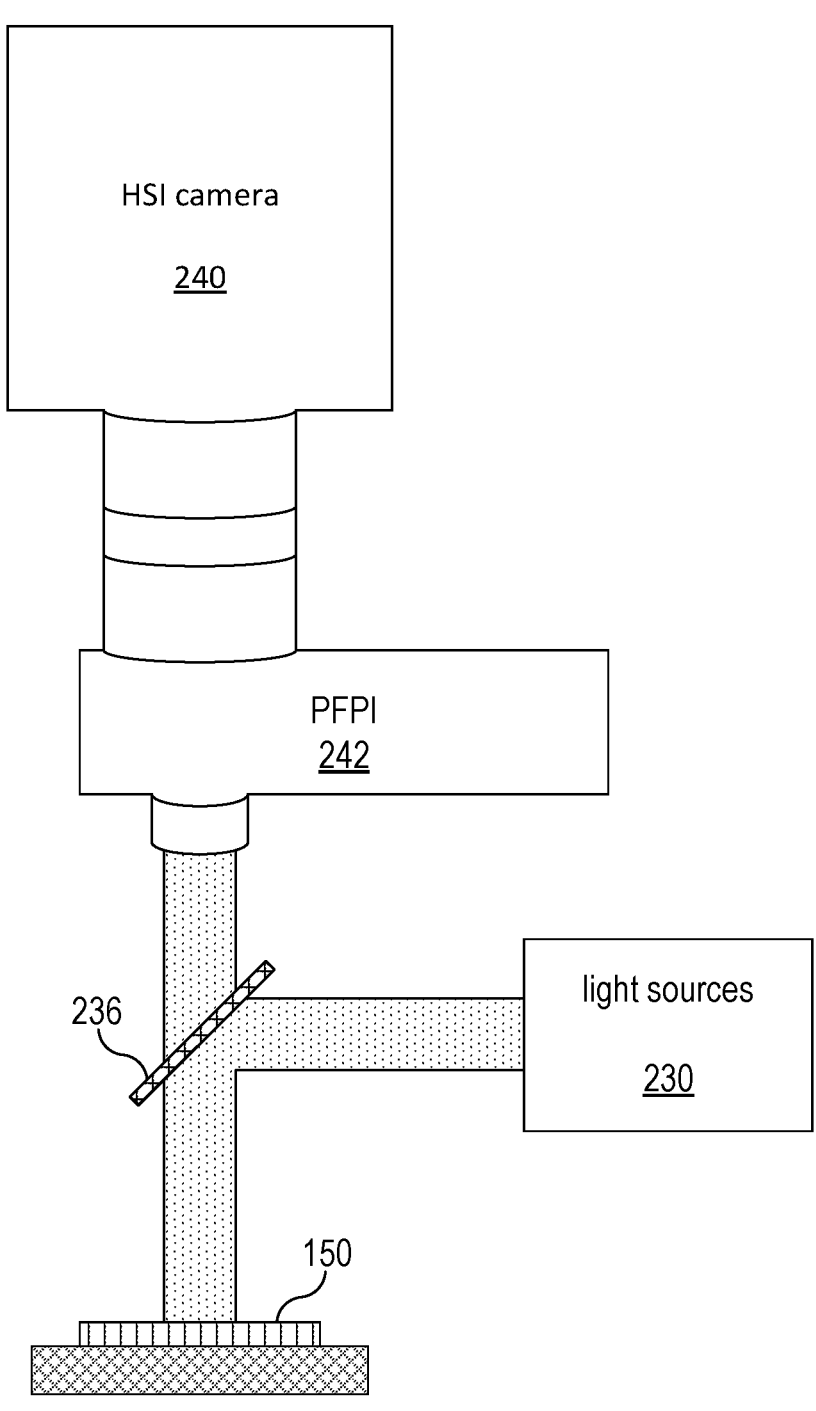

FIG. 2 illustrates an example broadband optical imaging system including a multispectral optical detector array implemented as an HSI system according to embodiments of the invention. The broadband optical imaging system of FIG. 2 may be a specific example of other broadband optical imaging systems described herein, such as the broadband optical imaging system of FIGS. 1A and 1B, for example. Similarly labeled elements may be as previously described.

Referring to FIG. 2, a broadband optical imaging system 201 that includes a multispectral optical detector array implemented as an HSI system is shown. The broadband optical imaging system 201 may utilize an HSI snapshot camera 240 based on Fabry Perot inline broadband illumi-nation. As previously described, this broadband illumination may then be coupled inline with a spatially coherent X-ray source. Film measurement capabilities include DUV, VIS, NIR, (and may include SWIR) simultaneously for expanded OCD metrology. For example, DUV may enable feature resolutions in the single digits of nanometers (i.e. about 1 nm to about 10 nm resolution).

The HSI snapshot camera 240 may be a compact snapshot camera with inline illumination comprised of multiple illu-mination bands. The sensor in HSI snapshot camera 240 may be hybrid (e.g., a multichannel sensor having at least three channels, including Si CMOS for DUV-VIS-NIR or DUV sCMOS and VIS-NIR CMOS combined by dichroic filter and GaAs/InGaAs for NIR-SWIR-IR, as examples). In some embodiments, the HSI snapshot camera 240 includes separate standalone cameras. Additionally, the camera may have a tunable Fabry Perot interferometer (FPI), such as a piezo-actuated FPI (PFPI 242). The PFPI 242 may, for example, be optimized with reflective coatings (e.g., sepa-rate coatings) for various optical ranges within the broad-band spectrum, such as one for DUV-VIS, one for VIS-NIR, one for SWIR-IR, or other combinations. In one embodi-ment, optical scatterometry can be performed in unison across the full range from DUV to VIS to NIR to SWIR to IR. Additionally or alternatively, optical scatterometry can be singularly focused into one band such as the DUV.

The broadband optical imaging system 201 may include a stage for supporting a DUT 150 during characterization. For example, the stage may be an electrostatic chuck (ESC), a susceptor, a movable stage (e.g. an X-Y, X-Y-θ, X-Y-Z, or X-Y-Z-θ, R-θ, R-Z-θ stage), part of a platen/substrate arm, etc. In various embodiments, the stage is a movable stage that is precisely aligned with the optical FOV of the HSI snapshot camera 240 so that the direct imaging of the HSI snapshot camera 240 can be used for navigation (e.g., in-die to in-die, to scribe lines) in conjunction with high resolution X-ray metrology. The broadband optical imaging system 201 may also include further subsystems, such as an enclo-sure (not shown), a purge gas system (not shown), such as for maintaining a controlled and clean environment sur-rounding the DUT 150.

One or more optical detectors are used to image the DUT 150 inside the broadband optical imaging system 201, during characterization (which may take place during a semiconductor process step or between process steps). A broadband optical source 230 may be used to illuminate the surface of the DUT 150. The broadband optical source 230 may be configured for bright field illumination (from above DUT 150) or for dark field illumination (with the illumina-tion beam substantially parallel to the surface of the DUT 150).

The broadband optical source 230 can be continuous wave (CW), or pulsed light source, and it can cover light wavelength ranges in the deep ultraviolet (DUV), ultraviolet (UV), visible (VIS), and infrared (IR) portions of the optical spectrum. The broadband optical source 230 can may include various incandescent and gas discharge light sources, flash lamps, LEDs, lasers, laser-driven plasma light sources (LDLS), etc., and can include further optics neces-sary to evenly illuminate the surface or a region of the surface of the DUT 150. The broadband optical source 230 may comprise multiple light sources, (e.g., when the broad-band optical source 230 covers a wide range of wavelengths) each covering a different light wavelength range, with beams combined using a suitable beam combiner optic. The broad-band optical source 230 may also include a shutter (not shown), to modulate the illumination beam such that inter-ference from other emissions acquired when the shutter is closed, can be subtracted from measured optical signals.

Upon incidence on DUT 150, a portion of the illumination beam is reflected from DUT 150, to form an optical signal. As previously discussed, the spectrum of the optical signal contains information from which properties of layers or structures or features on the DUT 150, can be determined during characterization. The HSI snapshot camera 240 may include collecting optics, a wavelength tunable filter (such as with a Fabry-Perot cavity like the PFPI 242), and an array detector. Although shown here with the PFPI 242, the HSI snapshot camera 240 may include other wavelength tunable filters, such as an acousto-optic tunable filter, a liquid crystal tunable filter, or any other tunable narrowband optical filter device capable of varying the passband wavelength.

In one embodiment, the array detector is a two-dimen-sional array detector. The array detector can comprise a CCD detector array, a CMOS detector array, a photodiode array, or a combination of detectors of various kinds for different portions of the array detector, if the application so demands. For example, different array detector types can be used, side-by-side or stacked, for different wavelength ranges, due to their inherent differences in wavelength sensitivity, etc.

Multispectral characterization relies on acquisition of optical spectra. During the process of extracting optical spectra an image cube is acquired at n passband wavelengths varied from $\lambda_1$, through $\lambda_i$, to $\lambda_n$ (which may be sampled across a single range or multiple separate ranges). In one embodiment, reflected, refracted, and diffracted optical spectra are extracted by extracting light intensities from a same single selected pixel in all images of the image cube. When the extracted light intensities are arranged in ascend-ing wavelength order, an optical spectrum is obtained.

Alternatively, the optical spectra may be extracted by extracting and averaging light intensities across at least one selected region of pixels in all images of the image cube. Multiple noncontiguous regions of pixels may be selected and averaged, depending on the application, which would dictate which portions of an image to retain and which portions to discard. Various averaging methods, pixel weighted and unweighted, can be used to arrive at an average light intensity across selected region(s) of pixels, for each image acquired at each wavelength 2. Once averaged, the average extracted light intensities are arranged in ascending wavelength order to form the optical spectrum of the region of interest (ROI). Now this ROI is compared across all images of all image cubes collected, in addition to spectral matching routines. Still alternatively, the reflected, refracted, and diffracted optical spectra may be extracted by extracting and averaging light intensities across all pixels of acquired images of the image cube. Here, each pixel is compared across all like images of all image cubes collected, and apply spectral matching routines, with or without machine learning. However, not all of the pixels may be analyzed when optical data is collected, region specific filtering may be used or combination of region filtering with pixel binning to improve signal-to-noise ratios. For example, only a certain region(s) of pixels in images of the image cube may be selected, such as those overlapping an X-ray FOV, for example.

Figure 3:
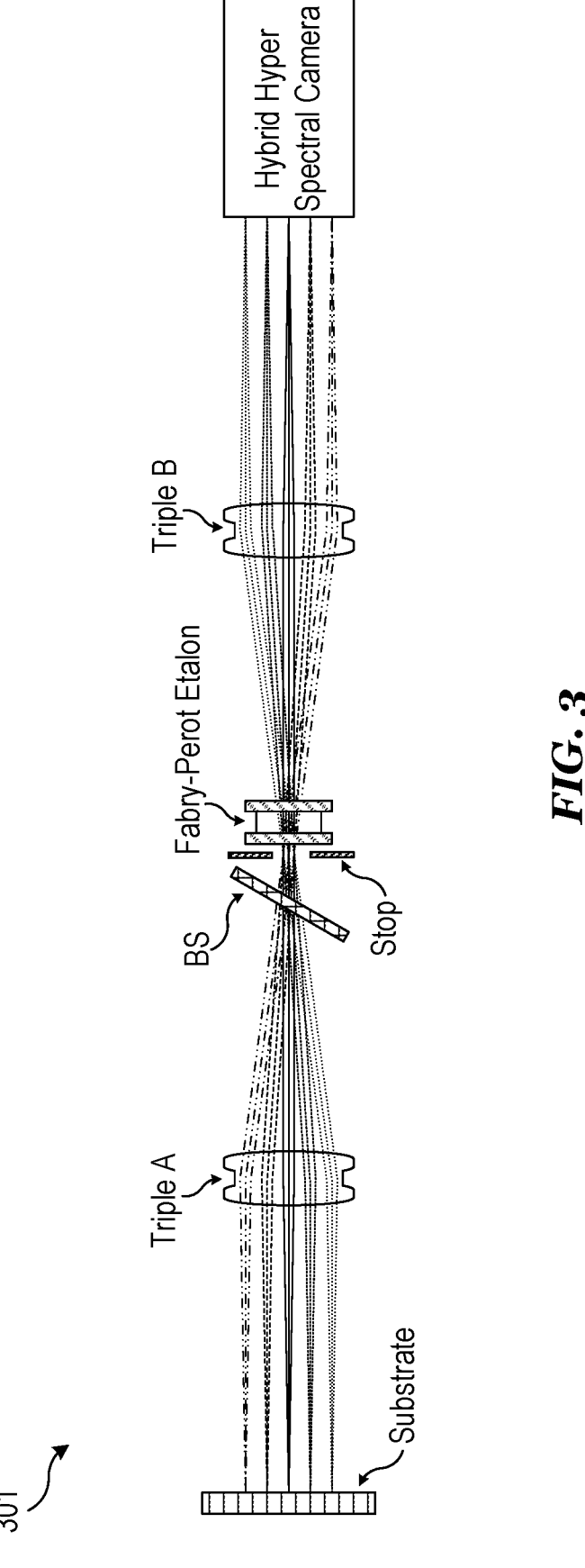
FIG. 3 schematically illustrates another example broadband optical imaging system that demonstrates the optical path of the broadband optical imaging system implemented as a telecentric imaging system in accordance with embodiments of the invention.

FIG. 3 schematically illustrates another example broadband optical imaging system 301 that demonstrates the optical path of the broadband optical imaging system implemented as a telecentric imaging system in accordance with embodiments of the invention. The broadband optical imaging system of FIG. 3 may illustrate functionality or features of other broadband optical imaging systems described herein such as the broadband optical imaging system of FIGS. 1A and 1B, for example. Similarly labeled elements may be as previously described.

Figures 4A, 4B:
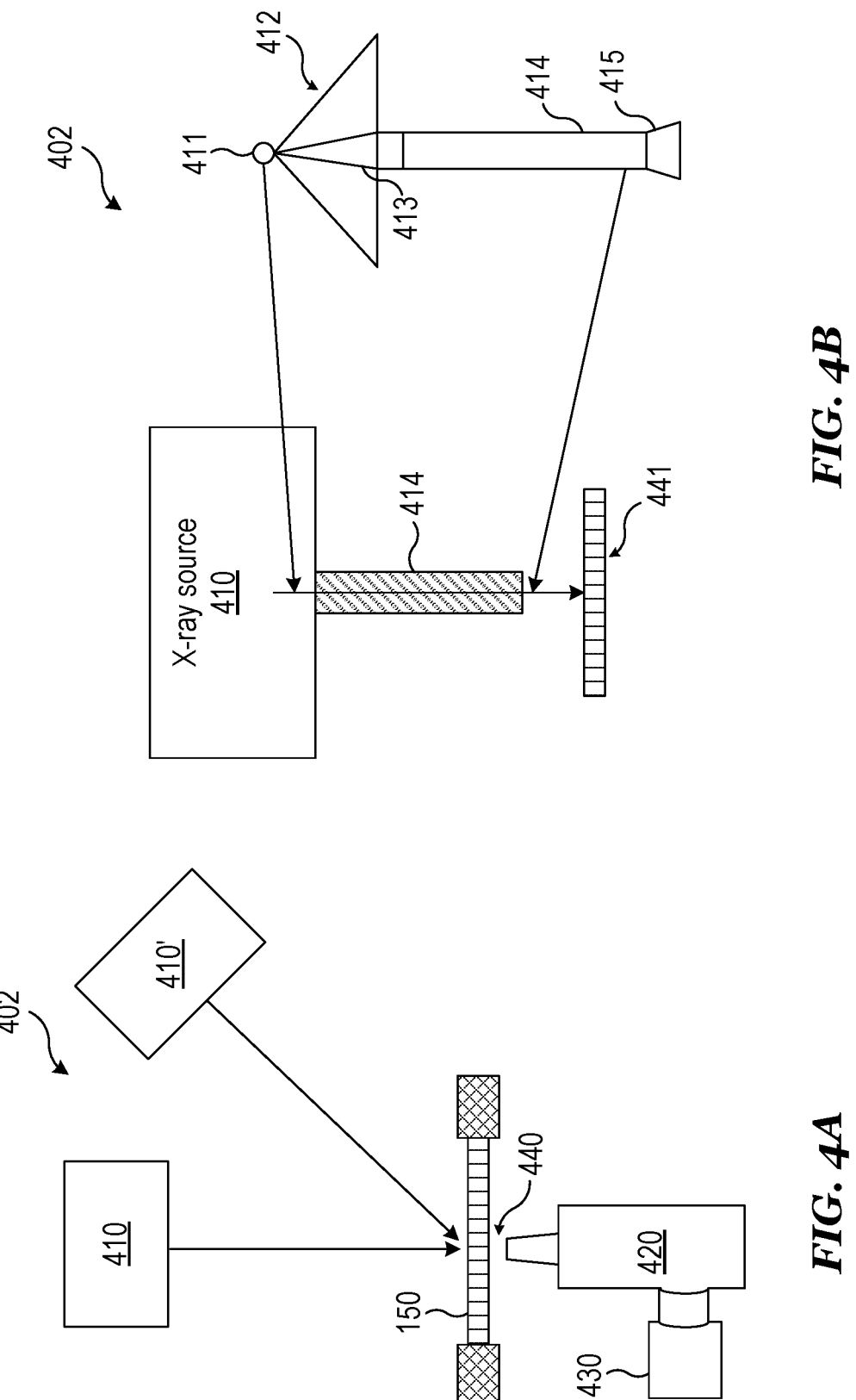
FIGS. 4A and 4B illustrate an example X-ray metrology system implemented as an X-ray imaging system where

FIGS. 4A and 4B illustrate an example X-ray metrology system implemented as an X-ray imaging system where FIG. 4A shows a perspective view of the X-ray metrology system and FIG. 4B shows a schematic of the X-ray metrology system in accordance with embodiments of the invention. The X-ray metrology system may be a specific implementation of other X-ray metrology systems described herein, such as the X-ray metrology system of FIGS. 1A and 1B, for example. Similarly labeled elements may be as previously described.

Referring to FIGS. 4A and 4B, an X-ray imaging system 402 is configured to irradiate X-rays that penetrate through a stack of materials 441 on or in a DUT 150 (e.g., a multilayer film of a wafer containing complex 3D structures) to measure structural and compositional properties of the DUT 150. As illustrated, the X-ray imaging system 402 includes an X-ray source 410, an optical train 420, and an X-ray detector 430 spaced apart from each other with a measurement gap 440 in between. The measurement gap 440, which allows transmissive inspection or metrology of the DUT 150 (e.g., a die or a wafer as shown here), may have a height in the range of 1 mm to 5 mm. The optical train 420 and the X-ray detector 430 (e.g. a high spatial resolution X-ray detector) may be disposed opposite the X-ray source 410 and the measurement gap 440, for true submicron optical resolution. True optical resolution can be defined as >2000 lines per mm at the corresponding value when the modulation transfer function (MTF) equals 10% of the maximum amplitude when measuring a well-calibrated set of lines and spaces (such as JIMA, NTT, or USAF metal targets).

The X-ray source 410 can include a point source 411 that is a broadband X-ray module applying X-rays in a range of 0-120 keV, for example, 20-100 keV or 30-90 keV, or, preferably, 50-70 keV. The X-ray source 410 may have sufficient power (e.g., in the energy range of 30-70 keV) to create image contrast between hybrid bonded metal-to-metal connections (e.g. Cu) and a background dielectric (e.g. Si, SiO2, SiN, SiCN) using full-field imaging. The X-ray source 410 may have a power of >150 W, with a divergence angle of <10 mRad, preferably <7 mRad, preferably <4 mRad, preferably <1 mRad, preferably <0.5 mRad, which may ensure that no significant blur is induced in the measurement gap 440 (e.g., about 0.5-7.5 mm, but may be about 1-5 mm, and preferably about 2-4 mm wide).

In one specific configuration, the X-ray source 410 is spatially-coherent and collimated with a top-hat X-ray intensity profile and has a full-width half-maximum (FWHM) beam size in a range of 5-25 mm, preferably 10-25 mm, preferably 15-25 mm. The X-ray source 410 may be turned on/off at >1 MHz repetition to enable pulse width modulation (PWM) control of dose deposited in the DUT 150 (such as a die or a wafer). Spatial coherence can be achieved by passing X-rays through a collimator (e.g., a capillary as in FIGS. 1A and 1B), diffracting from a crystal, or can be achieved at the source by a uniform repeating array of X-ray spots (e.g., array of capillaries, multiple laser spots in a laser driven plasma, array of field emitters spaced evenly against a uniform anode, array of X-ray spots generated from a broad e-beam source focused onto a patterned metal forming an array of anodes, all having either 1D or 2D periodicity), or can be achieved by a conventional source illuminating a phase shifting or phase absorbing X-ray grating, or using a synchrotron source. One of two modes of collimation can be used: monocapillary or polycapillary guiding as shown in FIG. 4B. That is, the point source 411 is configured to generate X-rays 412 which are uncollimated before a portion 413 of the X-rays 412 enters one or more capillaries 414. The one or more capillaries 414 can guide the portion 413 of the X-rays 412 such that the portion 413 of the X-rays 412 exits the one or more capillaries 414 as an X-ray beam 415 that includes substantially collimated X-rays having a divergence angle <10 mRad, preferably <7 mRad, preferably <4 mRad, preferably <1 mRad, preferably <0.5 mRad. Furthermore, the X-rays are substantially spatially coherent with a coherence length between about 10 μm and about 20 mm, preferably about 100 μm to about 20 mm, preferably about 1 mm to about 20 mm, preferably about 10 mm to about 20 mm. An X-ray with partial spatial coherent beam forms fringes with a delayed version of itself across a region that is about the size of the field being inspected.

In another configuration, the X-ray source 410 may be uncollimated, and shaped using high aspect ratio (HAR) tungsten pattern such as two pin holes separated at a distance or a single long hole through a tungsten block or another heavy atomic number metal plate. Alternatively, a plurality of metal plates forming a blade with many thin baffles may be used. The high aspect ratio (HAR, i.e. ratio of tungsten block height or thickness to hole diameter, or blade height to thickness) is >15:1, preferably >25:1, preferably >40:1, and preferably >50:1.

For image formation, the collimated or low-divergence X-rays (e.g. 413) passing through the capillary (e.g. 414) or HAR tungsten, penetrate through the layers (e.g. 443) and the DUT 150. The contrast image can be a 2D mass absorption map, phase contrast map, or small angle scatter (i.e., dark field map of regions with no metal and those with varying degrees of metal overlap). This 2D mass density or phase shift or dark field projection image can be transferred to a high spatial resolution pixel X-ray detector (e.g. 430) for CCD, CMOS, or sCMOS image recording and image feature extraction to characterize the DUT, or identify defects of interest.

The optical train 420 and the X-ray detector 430 can have unique features. The optical train 420 may include (1) a scintillator element that upconverts broadband X-rays to a single visible light wavelength, or more preferably into the UV/blue for Lyso:Ce, or green for GGG:Ce scintillators. Many common scintillators are available, with an ideal thickness in a range of 10-50 μm, preferably 10-40 μm, preferably 20-40 µm, preferably 25-35 µm. Such a scintillator may have an optically-reflective mirror coating on the X-ray source side, and an antireflection coating facing the X-ray detector 430 to maximize optical light propagation into the forward optics and camera, removing optical light back propagation towards the X-ray source 410.

The optical train 420 and X-ray detector 430 can include (2) an objective that is infinity corrected, has a super long working distance >25 mm, preferably >35 mm, preferably >50 mm, and has a magnification in a range of 10× to 50× with a numerical aperture NA >0.60, preferably >0.75, preferably >0.90. The optical train 420 and X-ray detector 430 can include (3) a "dog leg" or a bent path at about a 90 degree angle, between the scintillator and the objective, and the X-ray detector 430, completely preventing X-rays which are not stopped by the scintillator from entering the light optics of the objective and camera. An X-ray color center mitigation strategy may be employed to prevent severe browning of the light optical train from the objective to the X-ray detector 430, and loss of signal-to-noise ratio (SnR). Typically, optics browning may cause the light optics to be <30% transmissive over time period of hours, which may cause a severe impact on integrated or in-situ metrology in a matter of days or weeks, by diminishing the up-converted light signal.

The X-ray detector 430 (e.g., a CCD, CMOS, sCMOS sensor) can include (4) a narrow bandpass filter for passing only the selected wavelength of the scintillator, for reducing stray light from the environment from entering the X-ray detector 430. The narrow bandpass filter can be placed after the objective within the collimated space, or where the beam is orthogonal to the narrow bandpass filter and fully collimated reducing placement errors. The X-ray detector 430 can also include (5) a tube/transfer lens that refocuses the parallel optical light onto the sensor plane of camera and (6) a CCD, CMOS, or sCMOS camera with high quantum efficiency (QE) at the wavelength of detection, preferably a backside-illuminated and thinned scientific CMOS camera with >100 megapixel, and pixel sizes on the order of 2.5 µm to 5.5 µm, frame rates >300 fps for real time reporting and region of interest (ROI) selection, and a high bit depth (i.e. gray scale) of >16 bits for high dynamic range, and (7) an enclosure to mount the optics, and (8) a linear motor (e.g. a piezo motor) on the objective of optical train 420 to adjust remotely the best focus of the scintillator to the objective. Additionally, multiple objectives may be mounted on the linear motor, with rotary motor to change the magnification stage to the camera (e.g. 4× objective and a 10× to image both 0.75 µm and 300 nm with a nominal 2.75 µm pixel).

In one embodiment, an X-ray image is generated by converting X-rays to fluorescent light using a scintillator in the optical train 420 or X-ray detector 430. In another embodiment, an X-ray image is generated by direct imaging as an X-ray absorption, phase contrast, or small angle diffraction dark field image using a fully or partially transmitted signal or image. In yet another embodiment, an X-ray image is generated by phase contrast imaging, such as in-line propagation based phase contrast imaging, grating interferometry (e.g., X-ray Talbot interferometry and X-ray Talbot-Lau interferometry) and analyzer-based phase contrast imaging.

Figure 5:
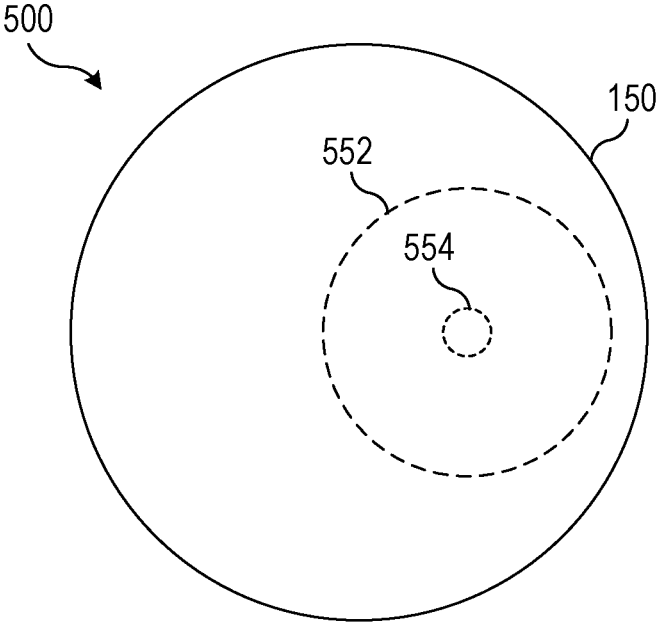
FIG. 5 illustrates a substrate in a characterization system with an X-ray FOV centered within an optical FOV in accordance with embodiments of the invention.

FIG. 5 illustrates a DUT in a characterization system with an X-ray FOV centered within an optical FOV in accordance with embodiments of the invention. The optical FOV and the X-ray FOV of FIG. 5 may correspond with FOVs of the systems and methods described herein, such as those of FIGS. 1A and 1B, for example. Similarly labeled elements may be as previously described.

Referring to FIG. 5, a system 500 for characterizing a DUT 150 (e.g., a substrate, such as a wafer, die, etc., having an electronic device, a stack of electronic devices, a 3DI system, and the like) includes an optical FOV 552 incident on a region of the DUT 150 (which may also be the entire DUT in some cases). Within the optical FOV 552, an X-ray beam illuminates an X-ray FOV 554 that is smaller than and overlaps the optical FOV 552. Of course, the relative shapes and sizes of the DUT 150, the optical FOV 552, and the X-ray FOV 554 are schematically drawn, rather than drawn to scale, and the shapes and sizes of all three elements may vary depending on the details of a specific implementation. Similarly, while the optical FOV 552 and the X-ray FOV 554 are aligned relative to one another so that the optical FOV 552 can be used to advantageously provide position information for the X-ray FOV 554, there is not a requirement that the X-ray FOV 554 be exactly centered within the optical FOV 552.

Figure 6:
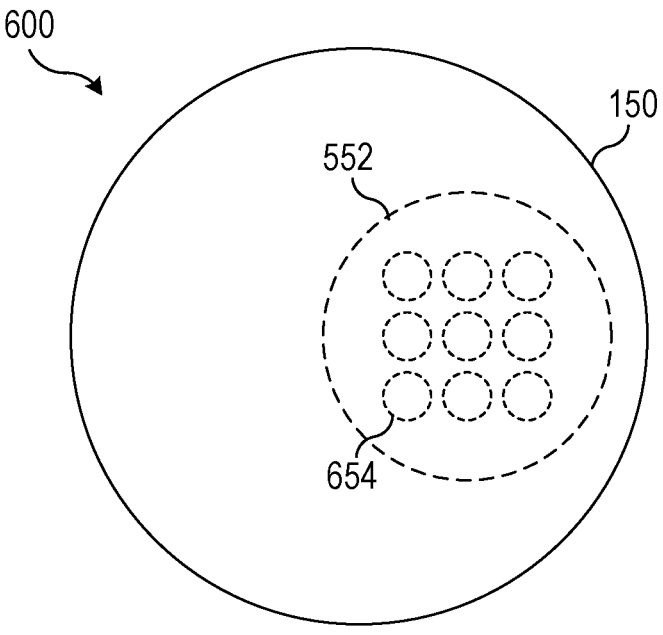
FIG. 6 illustrates a substrate in a characterization system with a plurality of X-ray FOVs aligned within an optical FOV in accordance with embodiments of the invention.

FIG. 6 illustrates a DUT in a characterization system with a plurality of X-ray FOVs aligned within an optical FOV in accordance with embodiments of the invention. The optical FOV and the X-ray FOV of FIG. 6 may correspond with FOVs of the systems and methods described herein, such as those of FIGS. 1A and 1B, for example. Similarly labeled elements may be as previously described.

Referring to FIG. 6, a system 600 for characterizing a DUT 150 (e.g., a substrate, such as a wafer, die, etc., having an electronic device, a stack of electronic devices, a 3DI system, and the like) includes an optical FOV 552 incident on a region of the DUT 150 (which may also be the entire DUT in some cases). In contrast with system 500, the system 600 includes a plurality of X-ray FOVs 654, all within the optical FOV 552. The number, arrangement, and spacing of the plurality of X-ray FOVs 654 may vary.

Figure 7:
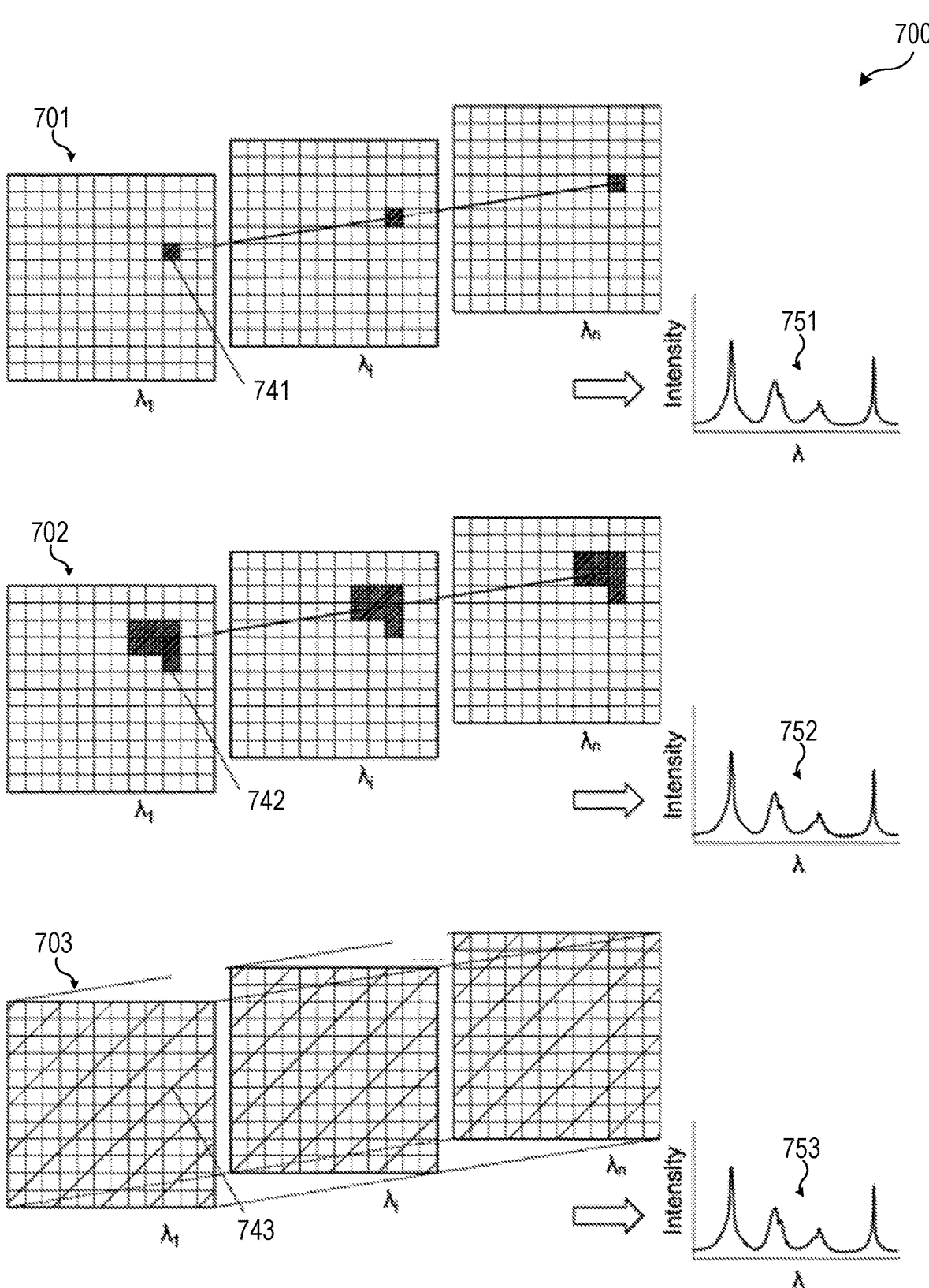
FIG. 7 illustrates several example image cubes that may be used during a process of extracting optical emission spectra in accordance with embodiments of the invention.

FIG. 7 illustrates several example image cubes that may be used during a process of extracting optical emission spectra in accordance with embodiments of the invention.

Referring to FIG. 7, the process of extracting plasma optical emission spectra from several example image cubes is schematically demonstrated. An image cube 701 is acquired at n passband wavelengths varied from $\lambda_1$, through $\lambda_i$, to $\lambda_n$. For example, the passband wavelengths may have an extended range, (i.e., by hyperspectral including wavelengths in the DUV, VIS, and IR (e.g., NIR and/or SWIR) portions of the electromagnetic spectrum). In this simplest example, plasma optical emission spectra are extracted by extracting light intensities from a same single selected pixel 741 in all images of the image cube 701. When the extracted light intensities are arranged in ascending wavelength order, a plasma optical emission spectrum 751 is obtained, which can be further utilized in the same way as a spectrum obtained from a traditional spectrometer.

Alternatively, plasma optical emission spectra are extracted from an image cube 702 by extracting and averaging light intensities across at least one selected region of pixels 742 in all images of the image cube 702. Multiple noncontiguous regions of pixels 742 may be selected and averaged, depending on the application, which would dictate which portions of an image to retain and which portions to discard. Various averaging methods, pixel weighted and unweighted, can be used to arrive at an average light intensity across selected region(s) of pixels 742, for each image acquired at each wavelength $\lambda_i$. Once averaged, the average extracted light intensities are arranged in ascending wavelength order to form a plasma optical emission spectrum 752.

Alternatively yet, plasma optical emission spectra are extracted from an image cube 703 by extracting and averaging light intensities across all pixels 743 of acquired images of the image cube 703. Various averaging methods, pixel weighted and unweighted, can be used to arrive at an average light intensity across the pixels 743, for each image acquired at each wavelength $\lambda_i$. Once averaged, the average extracted light intensities are arranged in ascending wavelength order to form a plasma optical emission spectrum 753.

When forming plasma optical emission spectra 750 as described in FIG. 7, all images in an image cube may be used to form plasma optical emission spectra. Alternatively, only a subset of images in an image cube may be used to form plasma optical emission spectra, thereby eliminating portions of the spectra that are not needed for a given application.

In DUT characterization, pixel locations in two-dimensional images of an image cube correspond generally to different regions of the DUT which are imaged onto the individual pixels of an optical detector (e.g., a multispectral array, such as a detector array with hyperspectral capabilities). One can advantageously select one of techniques used to in the image cubes 701, 702, and 703 to select the regions in of the DUT being probed. If higher spectral resolution is required than can be obtained by the selected type of wavelength tunable filter, a spectral deconvolution method can be used to reconstruct high resolution spectra from the acquired plasma optical emission spectra (e.g., 751, 752, and 753). Alternatively, machine-learning techniques can also be utilized to reconstruct higher resolution spectra from the acquired plasma optical emission spectra.

Figure 8:
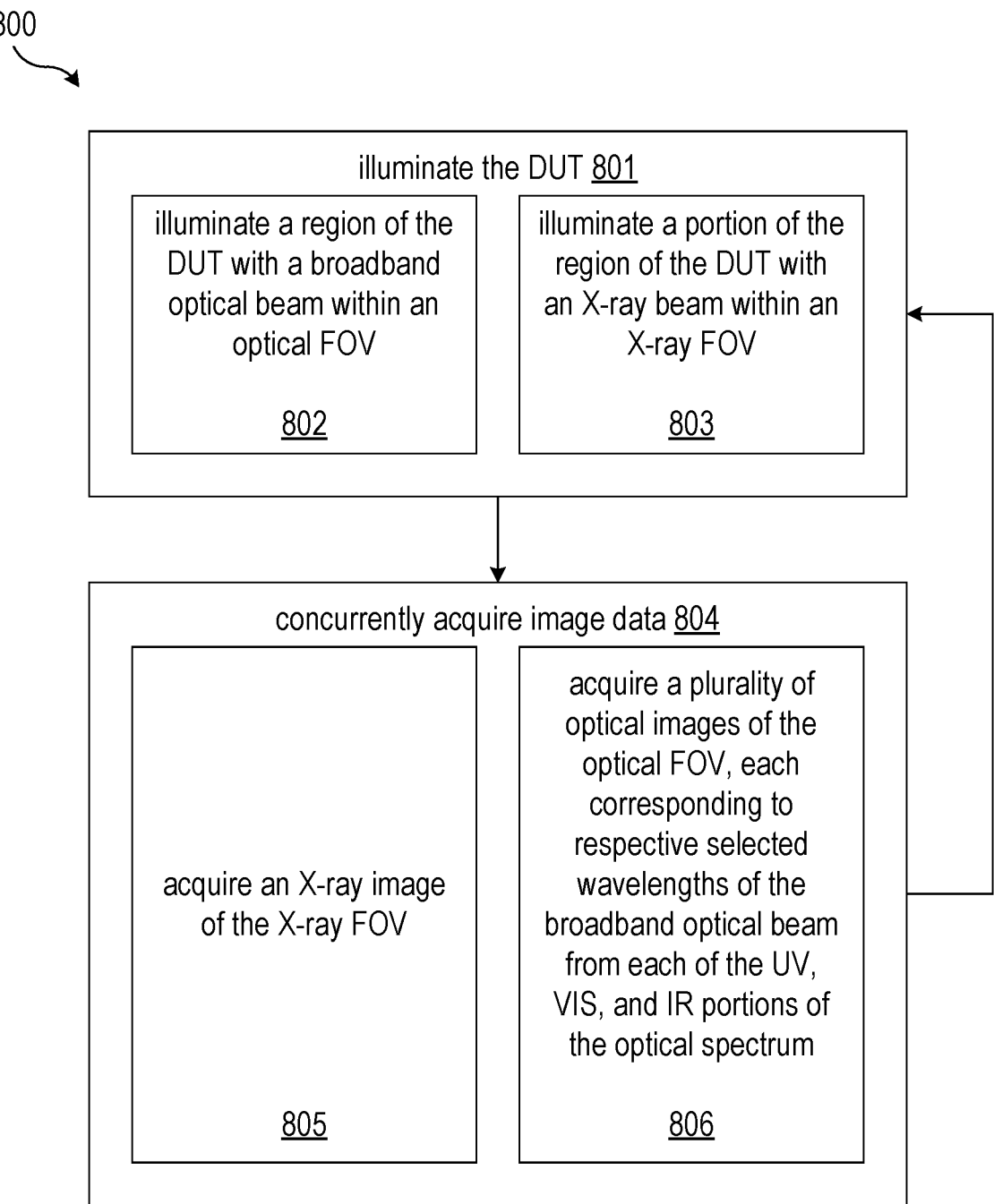
FIG. 8 illustrates an example method of characterizing a DUT in accordance with an embodiment of the invention.

FIG. 8 illustrates an example method of characterizing a DUT in accordance with an embodiment of the invention. The method of FIG. 8 may be combined with other methods and performed using the systems and apparatuses as described herein. For example, the method of FIG. 8 may be combined with any of the embodiments of FIGS. 1A-7. Although shown in a logical order, the arrangement and numbering of the steps of FIG. 8 are not intended to be limited. The method steps of FIG. 8 may be performed in any suitable order or concurrently with one another as may be apparent to a person of skill in the art.

Referring to FIG. 8, a method 800 includes a step 801 of illuminating the DUT. Specifically, a region of the DUT is illuminated with a broadband optical beam within an optical FOV in a step 802 and a portion of the region is illuminated with an X-ray beam within an X-ray FOV in a step 803. The X-ray FOV is not larger than the optical FOV. In various embodiments, the X-ray FOV is smaller than the optical FOV, but the X-ray FOV may also be equal in size to the optical FOV. In a step 804, image data is concurrently acquired by acquiring an X-ray image of the X-ray FOV in a step 805 and a plurality of optical images of the optical FOV in a step 806.

Each of the optical images correspond to respective selected wavelengths of the broadband optical beam. The selected wavelengths include at least one wavelength from each of the UV, VIS, and IR portions of the optical spectrum. For example, optical scatterometry data may be acquired during the step 806 for each of the selected wavelengths. In some embodiments, the selected wavelengths include the DUV portion of the optical spectrum. The selected wavelength(s) from the IR portion of the optical spectrum may be in the NIR portion or the SWIR portion of the optical spectrum. In some embodiments, the selected wavelengths include at least one wavelength from each of the DUV, VIS, and NIR portions of the optical spectrum, and in one embodiment, the range of the selected wavelengths also includes at least one wavelength from the SWIR portion of the optical spectrum.

As previously discussed, the DUT may be a single substrate, an electronic device wafer, a single die, a stack of electronic device wafers, a 3DI system of devices and/or circuits (die-to-die, die-to-wafer, and wafer-to-wafer), or any combination thereof. For example, the DUT may include one or more types of devices. In one embodiment, the DUT includes 3D memory. In another embodiment, the DUT includes a GAA transistor. In still another embodiment, the DUT includes CFET. The DUT may also include various structures. In one embodiment, the DUT includes 3DI Cu—Cu hybrid bonding. In another embodiment, the DUT includes backside power distribution networks (e.g., bonded to a memory or logic device wafer). In yet another embodiment, the DUT includes a plurality of stacked wafers.

The step 805 of acquiring the X-ray image may include one or more X-ray techniques, such as performing refraction imaging by measuring phase object differences, and collecting small angle scattering imaging using the X-ray beam in transmission mode to acquire an X-ray refraction image. Other X-ray techniques may also be included, such as acquiring an X-ray fluorescence image (whether instead of the X-ray refraction image or in addition to the X-ray refraction image, such as concurrently with acquiring the X-ray refraction image).

The method 800 may include additional analysis steps based on the concurrently acquired X-ray image and plurality of optical images. For example, the X-ray image and the plurality of optical images may be used to obtain complex structural information about the DUT. For example, models for 3D structure may be generated using the X-ray image and the plurality of optical images through multi-parameterization. For example, the multi-parameterization may use geometric elements and model parameters may be defined in a piecewise continuous fashion.

The multi-parameterization may take various forms. In one embodiment, the multi-parameterization includes optical figures of merit (FOM) utilizing HSI (hyperspectral imaging), such as critical dimension (CD), line edge roughness (LER), line width roughness (LWR), recess width roughness (RWR), recess edge roughness (RER), side wall angles (SWA), and critical thicknesses. In one specific example, the optical figures of merit utilizing HSI include UV light ranging from about 200 nm to about 400 nm. The multi-parameterization includes an X-ray fluorescence interference field in one embodiment. Further, in one embodiment, the multi-parameterization includes X-ray phase shift and SAXS from dark field (in transmission mode). Of course, any of these examples of parameterizations are combined to create the multi-parameterization in various embodiments.

The method 800 may also include other analysis steps. In one embodiment, correlations between model parameters are decoupled using the X-ray image and the plurality of optical images. In another embodiment material composition information of film layers of the DUT are derived using the X-ray image. The material composition information may then be used to enhance film model parameters of OCD parameters (e.g., OCD parameters, as part of 3D structure models generated using the X-ray image and the plurality of optical images) using X-ray image modalities comprising absorption, refraction, small angle scatter, fluorescence, or a combination thereof. Film model parameters may also be estimated using the material composition information.

Device defect difference capture maps and critical dimension maps may also be generated from the plurality of optical images in addition to generating the optical scatterometry data. The method 800 may also include capturing CD variation in 3D structures using the X-ray image and the plurality of optical images. The CD variation may include various classification modalities, such as CD classification according to extent of variation from nominal, CD classification according to defect type, and others.

The larger optical FOV may be leveraged to navigate to various regions of the DUT, in some embodiments. For example, the method 800 may include navigating to regions of interest on the DUT using optical spatial resolution of the plurality of optical images for global alignment, fine in-die alignment, pattern recognition, wafer mapping correction, selective DUT characterization, or any combination thereof. Switching between higher magnifications and lower magnifications may be achieved by switching between the X-ray FOV and the optical FOV during the method 800.

During the method 200, the DUT may be divided into unit areas of analysis (e.g., pixels, regions of interest (ROIs), whole dies, fractions of a die, etc.). An X-ray and optical spectral distribution may be generated for each unit area using the X-ray image and the plurality of optical images. The size of each of the unit areas of analysis may vary broadly, with each one covering between about 0.01% and 100% of the DUT. Equivalent areas (e.g., unit areas that have some similar characteristic, such as material composition, structure, arrangement, relative location, etc.) across different portions of the DUT may be compared using spectral matching and pixel binning to increase signal-to-noise ratio. Further, comparing the equivalent areas may be performed automatically in real-time using models or machine learning frameworks with unsupervised or supervised learning, and automated defect classification (ADC).

Example embodiments of the invention are summarized here. Other embodiments can also be understood from the entirety of the specification as well as the claims filed herein.

Example 1. A method of characterizing a DUT, the method including: illuminating a region of the DUT with a broadband optical beam within an optical FOV at the region; illuminating a portion of the region of the DUT with an X-ray beam within an X-ray FOV at the portion of the region, the X-ray FOV being smaller than or equal to and overlapping the optical FOV; and concurrently acquiring an X-ray image of the X-ray FOV and a plurality of optical images of the optical FOV, each of the optical images corresponding to respective selected wavelengths of the broadband optical beam, the selected wavelengths including at least one wavelength from each of the UV, VIS, and IR portions of the optical spectrum.

Example 2. The method of example 1, where the DUT includes 3D memory.

Example 3. The method of one of examples 1 and 2, where the DUT includes a GAA transistor.

Example 4. The method of one of examples 1 to 3, where the DUT includes a CFET.

Example 5. The method of one of examples 1 to 4, where the DUT includes a 2D material transistor.

Example 6. The method of one of examples 1 to 5, where the DUT includes 3DI Cu—Cu hybrid bonding.

Example 7. The method of one of examples 1 to 6, where the DUT includes backside power distribution networks bonded to a memory or logic device wafer.

Example 8. The method of one of examples 1 to 7, where the DUT includes a plurality of stacked wafers.

Example 9. The method of one of examples 1 to 8, where acquiring the X-ray image includes performing refraction imaging by measuring phase object differences, and collecting small angle scattering imaging using the X-ray beam in transmission mode to acquire X-ray refraction images or darkfield images.

Example 10. The method of example 9, further including: acquiring an X-ray fluorescence image concurrently with acquiring the X-ray image and the plurality of optical images.

Example 11. The method of one of examples 1 to 10, where acquiring the plurality of optical images includes collecting optical scatterometry data from each of the DUV, VIS, and NIR portions of the optical spectrum.

Example 12. The method of example 11, where collecting the optical scatterometry data further includes collecting optical scatterometry data from the SWIR portion of the optical spectrum.

Example 13. The method of one of examples 1 to 12, further including: generating models for 3D structure using the X-ray image and the plurality of optical images through multi-parameterization.

Example 14. The method of example 13, where the multi-parameterization includes OCD utilizing HSI.

Example 15. The method of example 14, where the OCD utilizing HSI includes UV light ranging from about 200 nm to about 400 nm.

Example 16. The method of one of examples 13 to 15, where the multi-parameterization includes an X-ray fluorescence interference field.

Example 17. The method of one of examples 13 to 16, where the multi-parameterization includes X-ray phase shift and SAXS from dark field in transmission mode.

Example 18. The method of one of examples 13 to 17, further including: decoupling correlation between model parameters using the X-ray image and the plurality of optical images.

Example 19. The method of one of examples 1 to 18, further including: deriving material composition information of film layers of the DUT using the X-ray image.

Example 20. The method of example 19, further including: using the X-ray image and the plurality of optical images to generate models for 3D structure through multi-parameterization including OCD parameters; and enhancing film model parameters of the OCD parameters using the material composition information from X-ray image modalities including absorption, refraction, small angle scatter, fluorescence, or a combination thereof.

Example 21. The method of one of examples 19 and 20, further including: estimating the film model parameters using the material composition information.

Example 22. The method of one of examples 1 to 21, further including: navigating to regions of interest on the DUT using optical spatial resolution of the plurality of optical images for global alignment, fine in-die alignment, such as to measure in-die pads or nominally similar areas within micron scale precision, pattern recognition, wafer mapping correction, selective DUT characterization, or any combination thereof.

Example 23. The method of one of examples 1 to 22, further including: switching between a higher magnification and a lower magnification by switching between the X-ray FOV and the optical FOV.

Example 24. The method of one of examples 1 to 23, further including: generating both optical scatterometry data from the plurality of optical images and X-ray fluorescence field interference data from the X-ray image.

Example 25. The method of one of examples 1 to 24, further including: generating optical scatterometry data from the plurality of optical images; and generating X-ray data from the X-ray image, the X-ray data including one or both of X-ray small angle x-ray scattering (SAXS) data and X-ray phase shift variation data.

Example 26. The method of one of examples 1 to 25, further including: generating device defect difference capture maps and critical dimension maps from the plurality of optical images in addition to generating the optical scatterometry data.

Example 27. The method of one of examples 1 to 26, where the DUT is divided into unit areas of analysis, and where the method further includes: generating, for each of the unit areas of analysis, an X-ray and optical spectral distribution using the X-ray image and the plurality of optical images, the unit areas of analysis being pixels, regions of interest (ROIs), whole dies, or fractions of a die.

Example 28. The method of example 27, where each of the unit areas of analysis cover between about 0.01% and 100% of the DUT.

Example 29. The method of one of examples 27 and 28, further including: comparing equivalent areas across different portions of the DUT using spectral matching and pixel binning to increase signal-to-noise ratio.

Example 30. The method of example 29, where comparing the equivalent areas is performed automatically in real-time using models or machine learning frameworks with unsupervised or supervised learning, and ADC.

Example 31. The method of one of examples 1 to 30, further including: capturing figure of merit (FOM) variation, such as CD, LER, LWR, recess width roughness, recess edge roughness, various sidewall angles, various thicknesses, in 3D structures using the X-ray images and the plurality of optical images.

Example 32. The method of example 31, where the FOM variation includes FOM classification according to extent of variation from nominal.

Example 33. The method of one of examples 31 and 32, where the FOM variation includes FOM classification according to defect type.

Example 34. A system for characterizing a DUT, the system including: a broadband optical imaging system including a broadband optical source configured to illuminate a region of the DUT with a broadband optical beam within an optical FOV, and an optical detector having the optical FOV; and an X-ray metrology system including an X-ray source to illuminate a portion of the region of the DUT with an X-ray beam within an X-ray FOV at the portion of the region, and an X-ray detector having the X-ray FOV, the X-ray FOV being smaller than or equal to and overlapping the optical FOV, where the broadband optical imaging system and the X-ray metrology system are configured to concurrently acquire an X-ray image of the X-ray FOV and a plurality of optical images of the optical FOV, each of the optical images corresponding to respective selected wavelengths of the broadband optical beam, the selected wavelengths including at least one wavelength from each of the UV, VIS, and IR portions of the optical spectrum.

Example 35. The system of example 34, where the broadband optical imaging system includes broadband optics configured to direct the broadband optical beam to be coincident with the X-ray beam for illumination and collection.

Example 36. The system of one of examples 34 and 35, where the X-ray detector is configured to operate in transmission mode.

Example 37. The system of one of examples 34 to 36, where the X-ray detector is configured to operate in reflection mode.

Example 38. The system of one of examples 34 to 37, further including a sample support configured to support the DUT and scan with at least about micron precision.

Example 39. The system of example 38, where the sample support includes coordinates aligned with the optical FOV, the sample support being further configured to navigate in-die, such as to specific pads or similar regions or to scribe lines with at least about micron precision.

Example 40. The system of example 39, where the sample support is further configured to navigate in-die, such as to specific pads or similar regions or to scribe lines with at least about submicron precision.

Example 41. The system of one of examples 34 to 40, where the X-ray FOV is aligned with the optical FOV.

Example 42. The system of example 41, where an alignment error between the optical FOV and the X-ray FOV allows X-ray imaging of an OCD matrix pad having a CD between about 1 μm and about 25 μm.

Example 43. The system of one of examples 41 and 42, where the alignment error between the optical FOV and the X-ray FOV allows X-ray imaging of an in-die feature.

Example 44. The system of one of examples 41 to 43, where the X-ray FOV is centered within the optical FOV.

Example 45. The system of one of examples 41 to 43, where the X-ray FOV is offset from the optical FOV by a predetermined amount.

Example 46. The system of example 45, where the X-ray FOV and the optical FOV have a coincident corner.

Example 47. The system of one of examples 34 to 46, where the X-ray image and the plurality of optical images are acquired in real-time with synchronized frame rates, the plurality of optical images being acquired by an optical scatterometry imaging spectrometer of the broadband optical imaging system.

Example 48. The system of example 47, further including a sample support configured to support the DUT and scan with movement coordinated with the real-time acquisition enabling a move, acquire, measure cycle time for production metrology and inspection in wafer foundries or device fabricators.

Example 49. The system of one of examples 34 to 48, where the system is configured to simultaneously register a lower magnification of the optical FOV and a higher magnification of the X-ray FOV and to dynamically switch between the higher magnification and the lower magnification by switching between the X-ray FOV and the optical FOV.

Example 50. A system for characterizing a substrate including: a broadband optical source configured to illuminate a region of the substrate with a broadband optical beam within an FOV; an HSI snapshot camera having the optical FOV; an X-ray source configured to illuminate a portion of the region of the substrate with an X-ray beam within an X-ray FOV at the portion of the region; and an X-ray detector having the X-ray FOV, the X-ray FOV being smaller than or equal to and overlapping the optical FOV; and where the X-ray detector and the HSI snapshot camera are configured to concurrently acquire X-ray data from the X-ray FOV and a hyperspectral image cube of the optical FOV, the hyperspectral image cube including at least one wavelength from each of the DUV, VIS, and NIR portions of the optical spectrum.

Example 51. The system of example 50, where the HSI snapshot camera has a wide band of imaging ranging from the DUV portion through the VIS portion to the SWIR portion of the optical spectrum, and where the hyperspectral image cube further includes at least one wavelength from the SWIR portion of the optical spectrum.

Example 52. The system of one of examples 50 and 51, where the HSI snapshot camera includes a multichannel sensor with at least 3 channels.

Example 53. The system of example 52, where the multichannel sensor includes an InGaAs/GaAs hybrid sensor on Si.

Example 54. The system of one of examples 50 to 53, where the multichannel sensor has 4 channels and bins 4 contiguous pixels that repeat across an entire Si CMOS array in an RGBG four-square Bayered pattern with a fourth element X replacing the second green color filter as RGBX, X being an upconversion fluorophore or phosphor configured to integrate a UV signal ranging from about 200 nm to about 400 nm.

Example 55. The system of one of examples 50 to 54, where the HSI snapshot camera includes separate standalone cameras.

Example 56. The system of one of examples 50 to 55, where the HSI snapshot camera includes an FPI in an optical path of the broadband optical beam, the FPI having separate optimized reflective coatings corresponding to ranges of wavelengths of the hyperspectral image cube.

Example 57. The system of one of examples 50 to 56, where the HSI snapshot camera has inline illumination of the substrate.

Example 58. The system of one of examples 50 to 57, where the HSI snapshot camera includes a bi-telecentric optical train.

Example 59. The system of one of examples 50 to 58, where the X-ray detector includes an imaging-type X-ray probe.

Example 60. The system of example 59, where the imaging-type probe is a super-resolving X-ray camera configured to use subpixel shifting.

Example 61. The system of one of examples 50 to 60, where the X-ray detector includes a non-imaging type X-ray probe.

Example 62. The system of one of examples 50 to 61, further including: X-ray optics including a capillary X-ray guiding element.

Example 63. The system of example 62, where the capillary X-ray guiding element is a mono-capillary guiding element.

Example 64. The system of example 62, where the capillary guiding element is a poly-capillary guiding element.

Example 65. The system of one of examples 50 to 64, further including: an open-frame substrate support configured to position the substrate in the optical FOV.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of characterizing a device under test (DUT), the method comprising:

illuminating a region of the DUT with a broadband optical beam within an optical field of view (FOV) at the region;

illuminating a portion of the region of the DUT with an X-ray beam within an X-ray FOV at the portion of the region, the X-ray FOV being smaller than or equal to and overlapping the optical FOV;

concurrently acquiring an X-ray image of the X-ray FOV and a plurality of optical images of the optical FOV, each of the plurality of optical images corresponding to respective selected wavelengths of the broadband optical beam, the selected wavelengths comprising at least one wavelength from each of the ultraviolet (UV), visible (VIS), and infrared (IR) portions of the optical spectrum; and determining structural properties of the DUT through scatterometry methods using the X-ray image in combination with the plurality of optical images.

2. The method of claim 1, wherein acquiring the X-ray image comprises performing refraction imaging by measuring phase object differences, and collecting small angle scattering imaging using the X-ray beam in transmission mode to acquire an X-ray refraction image or a darkfield image.

3. The method of claim 1, further comprising:

generating models for three-dimensional structure using the X-ray image and the plurality of optical images through multi-parameterization comprising optical figures of merit (FOM) utilizing hyperspectral imaging (HSI).

4. The method of claim 1, further comprising:

generating models for three-dimensional structure using the X-ray image and the plurality of optical images through multi-parameterization comprising an X-ray fluorescence interference field.

5. The method of claim 1, further comprising:

generating models for three-dimensional structure using the X-ray image and the plurality of optical images through multi-parameterization comprising X-ray phase shift and small angle X-ray scattering (SAXS) from dark field in transmission mode.

6. The method of claim 1, further comprising:

switching between a higher magnification and a lower magnification by switching between the X-ray FOV and the optical FOV.

7. The method of claim 1, wherein the DUT is divided into unit areas of analysis, and wherein the method further comprises:

generating, for each of the unit areas of analysis, an X-ray and optical spectral distribution using the X-ray image and the plurality of optical images, the unit areas of analysis being pixels, regions of interest (ROIs), whole dies, or fractions of a die.

8. The method of claim 1, wherein the scatterometry methods using the X-ray image in combination with the plurality of optical images comprise reducing a set of floated parameters using the X-ray image, and matching spectra of the plurality of optical images using the reduced set of floated parameters.

9. The method of claim 2, further comprising:

acquiring an X-ray fluorescence image concurrently with acquiring the X-ray image and the plurality of optical images.

10. The method of claim 7, further comprising:

comparing equivalent areas across different portions of the DUT using spectral matching and pixel binning to increase signal-to-noise ratio.

11. A system for characterizing a device under test (DUT), the system comprising:

a broadband optical imaging system comprising a broadband optical source configured to illuminate a region of the DUT with a broadband optical beam within an optical field of view (FOV), and an optical detector having the optical FOV; and an X-ray metrology system comprising an X-ray source to illuminate a portion of the region of the DUT with an X-ray beam within an X-ray FOV at the portion of the region, and an X-ray detector having the X-ray FOV, the X-ray FOV being smaller than or equal to and overlapping the optical FOV, wherein the broadband optical imaging system and the X-ray metrology system are configured to concurrently acquire an X-ray image of the X-ray FOV and a plurality of optical images of the optical FOV, each of the plurality of optical images corresponding to respective selected wavelengths of the broadband optical beam, the selected wavelengths comprising at least one wavelength from each of the ultraviolet (UV), visible (VIS), and infrared (IR) portions of the optical spectrum, and determine structural properties of the DUT through scatterometry methods using the X-ray image in combination with the plurality of optical images.

12. The system of claim 11, wherein the broadband optical imaging system comprises broadband optics configured to direct the broadband optical beam to be coincident with the X-ray beam for illumination and collection.

13. The system of claim 11, further comprising a sample support configured to support the DUT and comprising coordinates aligned with the optical FOV, the sample support being further configured to navigate in-die or to scribe lines with at least about micron precision.

14. The system of claim 11, wherein the X-ray image and the plurality of optical images are acquired in real-time with synchronized frame rates, the plurality of optical images being acquired by an optical scatterometry imaging spectrometer of the broadband optical imaging system.

15. The system of claim 14, further comprising a sample support configured to support the DUT and scan with movement coordinated with the real-time acquisition enabling a move, acquire, measure cycle time for production metrology and inspection in wafer foundries or device fabricators.

16. A system for characterizing a substrate comprising:

a broadband optical source configured to illuminate a region of the substrate with a broadband optical beam within an optical field of view (FOV);

a hyperspectral imaging (HSI) snapshot camera having the optical FOV;

an X-ray source configured to illuminate a portion of the region of the substrate with an X-ray beam within an X-ray FOV at the portion of the region; and an X-ray detector having the X-ray FOV, the X-ray FOV being smaller than or equal to and overlapping the optical FOV; and wherein the X-ray detector and the HSI snapshot camera are configured to concurrently acquire X-ray data from the X-ray FOV and a hyperspectral image cube of the optical FOV, the hyperspectral image cube comprising at least one wavelength from each of the deep ultraviolet (DUV), visible (VIS), and near infrared (NIR) portions of the optical spectrum, and determine structural properties through scatterometry methods using the X-ray data in combination with the hyperspectral image cube.

17. The system of claim 16, wherein the HSI snapshot camera has a wide band of imaging ranging from the DUV portion through the VIS portion to the short-wavelength infrared (SWIR) portion of the optical spectrum, and wherein the hyperspectral image cube further comprises at least one wavelength from the SWIR portion of the optical spectrum.

18. The system of claim 16, wherein the HSI snapshot camera comprises a Fabry-Perot interferometer (FPI) in an optical path of the broadband optical beam, the FPI having separate optimized reflective coatings corresponding to ranges of wavelengths of the hyperspectral image cube.

19. The system of claim 16 wherein the X-ray detector comprises a super-resolving X-ray camera configured to use subpixel shifting.

20. The system of claim 16, further comprising:

X-ray optics comprising a capillary X-ray guiding element.

* * * * *